United States Patent
Rauh et al.

(10) Patent No.: US 10,718,387 B2
(45) Date of Patent: Jul. 21, 2020

(54) WEDGE CLUTCH WITH RESIDUAL MAGNETISM ATTENUATION AND PUMP WITH RESIDUAL MAGNETISM ATTENUATION

(71) Applicant: Schaeffler Technologies AG & Co. KG, Herzogenaurach (DE)

(72) Inventors: Kevin Rauh, Stow, OH (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 70 days.

(21) Appl. No.: 16/142,011

(22) Filed: Sep. 26, 2018

(65) Prior Publication Data

US 2020/0096055 A1   Mar. 26, 2020

(51) Int. Cl.

| | |
|---|---|
| *F16D 27/102* | (2006.01) |
| *F16D 15/00* | (2006.01) |
| *F16D 41/063* | (2006.01) |
| *F16D 41/08* | (2006.01) |
| *F04C 2/10* | (2006.01) |
| *F04C 15/00* | (2006.01) |

(52) U.S. Cl.
CPC .......... *F16D 27/102* (2013.01); *F16D 15/00* (2013.01); *F16D 41/063* (2013.01); *F16D 41/082* (2013.01); *F04C 2/105* (2013.01); *F04C 15/008* (2013.01)

(58) Field of Classification Search
None
See application file for complete search history.

(56) References Cited

U.S. PATENT DOCUMENTS

| | | | |
|---|---|---|---|
| 2016/0238090 A1* | 8/2016 | Spencer | ............... F16D 41/082 |
| 2017/0328362 A1 | 11/2017 | Hemphill et al. | |
| 2018/0259008 A1 | 9/2018 | Hixenbaugh et al. | |

* cited by examiner

*Primary Examiner* — Timothy Hannon

(57) ABSTRACT

A clutch, including: inner and outer races; a wedge plate; an electromagnetic actuator including a coil and an attenuating circuit. The coil is arranged to be energized by a power source to switch the wedge clutch between: a locked mode in which the inner and races are locked in a circumferential direction and a free-wheel mode in which the inner race is rotatable with respect to the outer race in the circumferential direction. The attenuating circuit includes a capacitor parallel with the coil and a switch wired to the capacitor. During the free-wheel mode: the switch is arranged to connect the capacitor to an electrical ground; and the electrical power source is arranged to energize the coil and charge the capacitor with a voltage. Following initiation of the locked mode: the switch isolates the capacitor from the electrical ground; and the capacitor discharges the voltage through the coil.

17 Claims, 20 Drawing Sheets

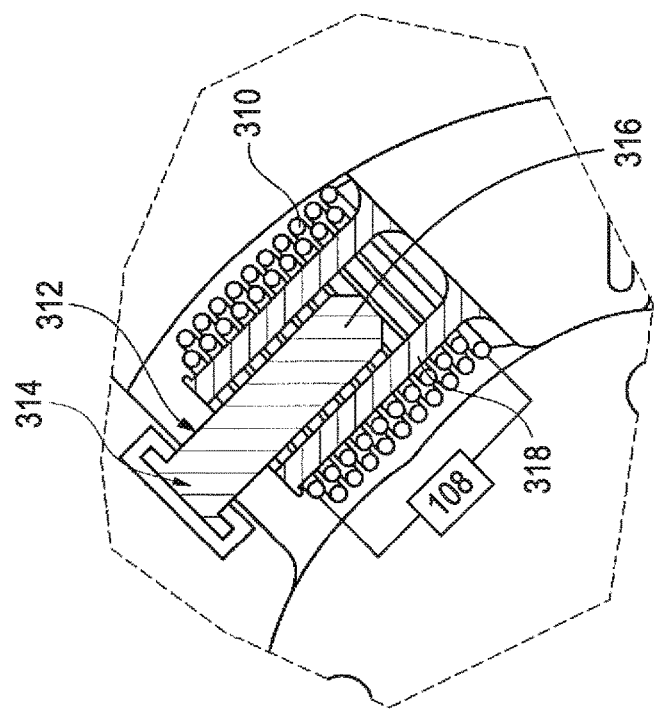
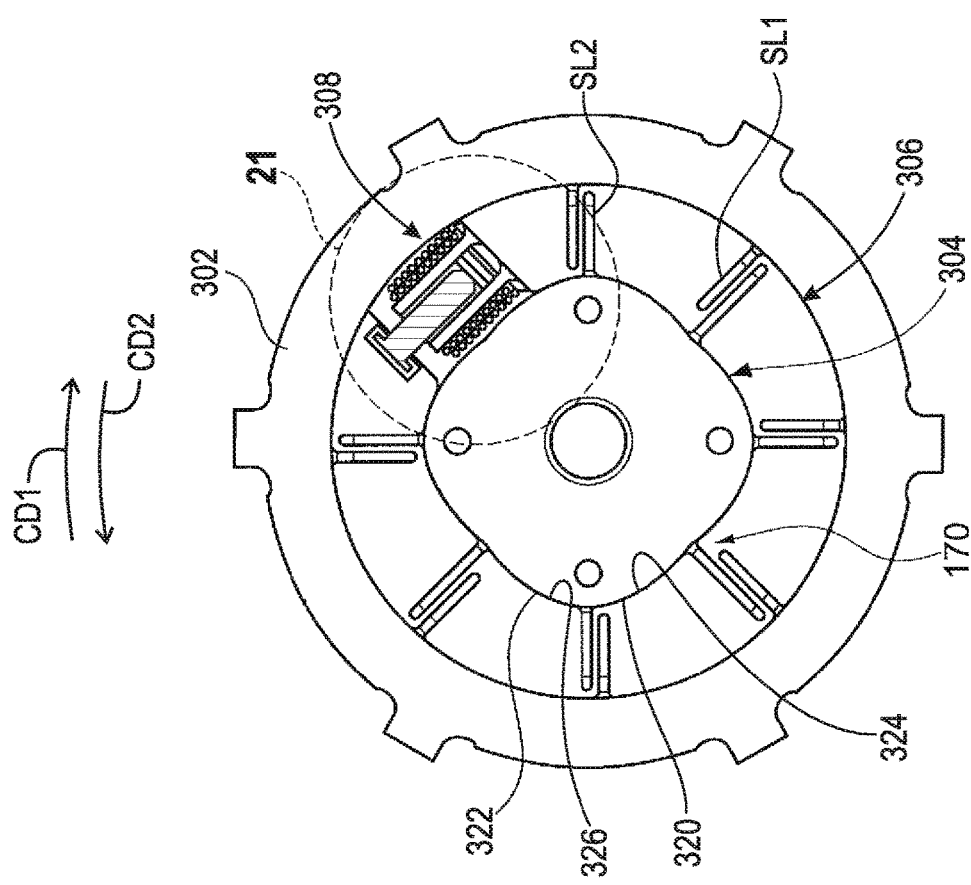
Fig. 21
Fig. 20

US 10,718,387 B2

WEDGE CLUTCH WITH RESIDUAL MAGNETISM ATTENUATION AND PUMP WITH RESIDUAL MAGNETISM ATTENUATION

TECHNICAL FIELD

The present disclosure relates to a wedge clutch with an actuator including an attenuating circuit for removing residual magnetism and a pump including an attenuating circuit for removing residual magnetism

BACKGROUND

For known electromagnetic devices, windings in or around ferromagnetic material are energized to create magnet fields used to displace components of the electromagnetic device. For example: a winding (coil) of a solenoid is energized to create a magnetic field displacing a pin surrounded by the winding; and for a reluctance motor, circumferentially disposed windings of a stator are energized and de-energized in sequence to create rotating magnetic fields that rotate a rotor for the pump. When windings are de-energized, residual magnetism remains in the ferromagnetic material associated with the windings. The residual magnetism resists displacement of the components to desired positions, for example, the pin for the solenoid returning to a pre-energized position, or continued rotation of the rotor for the pump.

SUMMARY

According to aspects illustrated herein, there is provided a wedge clutch, including: an axis of rotation; an inner race; an outer race located radially outward of the inner race; a wedge plate radially disposed between the inner race and the outer race; an electromagnetic actuator including a coil and an attenuating circuit. The coil is arranged to be energized by an electrical power source to displace the wedge plate, with respect to the inner race or the outer race, to switch the wedge clutch between: a first locked mode of the wedge clutch, in which the inner race, the wedge plate, and the outer race are non-rotatably connected for rotation of the inner race in a first circumferential direction; and a first free-wheel mode of the wedge clutch, in which the inner race is rotatable, with respect to the outer race, in the first circumferential direction. The attenuating circuit includes: a capacitor wired in parallel with the coil; and a switch wired to the capacitor. During the first free-wheel mode: the first switch is arranged to connect the capacitor to an electrical ground; and the electrical power source is arranged to energize the coil and charge the capacitor with a voltage. Following an initiation of the first locked mode: the first switch is arranged to electrically isolate the capacitor from the electrical ground; and the capacitor is arranged to discharge the voltage through the coil.

According to aspects illustrated herein, there is provided a wedge clutch, including: an axis of rotation; an inner race; an outer race located radially outward of the inner race; a wedge plate radially disposed between the inner race and the outer race and including a first circumferential end and a second circumferential end; and an electromagnetic actuator including a coil and an attenuating circuit. The coil: includes a first coil core piece fixedly connected to the first circumferential end and with an end enclosed by the coil; and is arranged to be energized by an electrical power source to draw the first coil core piece and the second circumferential toward each other to switch the wedge clutch between a locked mode in which the inner race, the wedge plate, and the outer race are non-rotatably engaged for rotation of the inner race in a circumferential direction and a free-wheel mode in which the inner race is rotatable with respect to the outer race in the circumferential direction. The attenuating circuit includes: a capacitor electrically wired in parallel with the coil; and a switch electrically connected to the capacitor. During the free-wheel mode: the first switch is arranged to connect the capacitor to an electrical ground; and the electrical power source is arranged to charge the capacitor with a voltage and energize the coil. Following an initiation of the locked mode: the first switch is arranged to electrically isolate the capacitor from the electrical ground; and the capacitor is arranged to discharge the voltage through the coil.

According to aspects illustrated herein, there is provided a pump, including: a fluid inlet section; a fluid outlet section; a stator axially between the fluid inlet section and the fluid outlet section; a rotor axially between the fluid inlet section and the fluid outlet section, the rotor and the stator defining a fluid flow space radially therebetween; a movable inlet guide configured for guiding fluid flow from the fluid inlet section into the fluid flow space; a movable outlet guide arranged to guide fluid flow from the fluid flow space into the fluid outlet section; and an attenuating circuit. The stator includes: a plurality of radially inwardly extending legs; and a plurality of electrical windings disposed about the plurality of radially inwardly extending legs and arranged to be connected to an electrical power source. The attenuating circuit includes: a capacitor electrically wired in parallel with a first electrical winding of the plurality of electrical windings; and a switch electrically connected to the capacitor. The rotor is arranged to be rotated inside of the stator by energization of the plurality of electrical windings. During the energization of the plurality of electrical windings: the switch is arranged to electrically connect the capacitor to an electrical ground; and the electrical power source is arranged to create a voltage in the capacitor, following a de-energization of the plurality of electrical windings: the switch is arranged to electrically isolate the capacitor from the electrical ground; and the capacitor is arranged to discharge the voltage through the first electrical winding.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 20 is front view of an example wedge clutch with residual magnetism attenuation;

FIG. 21 is an enlarged view of region 21 in FIG. 20;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
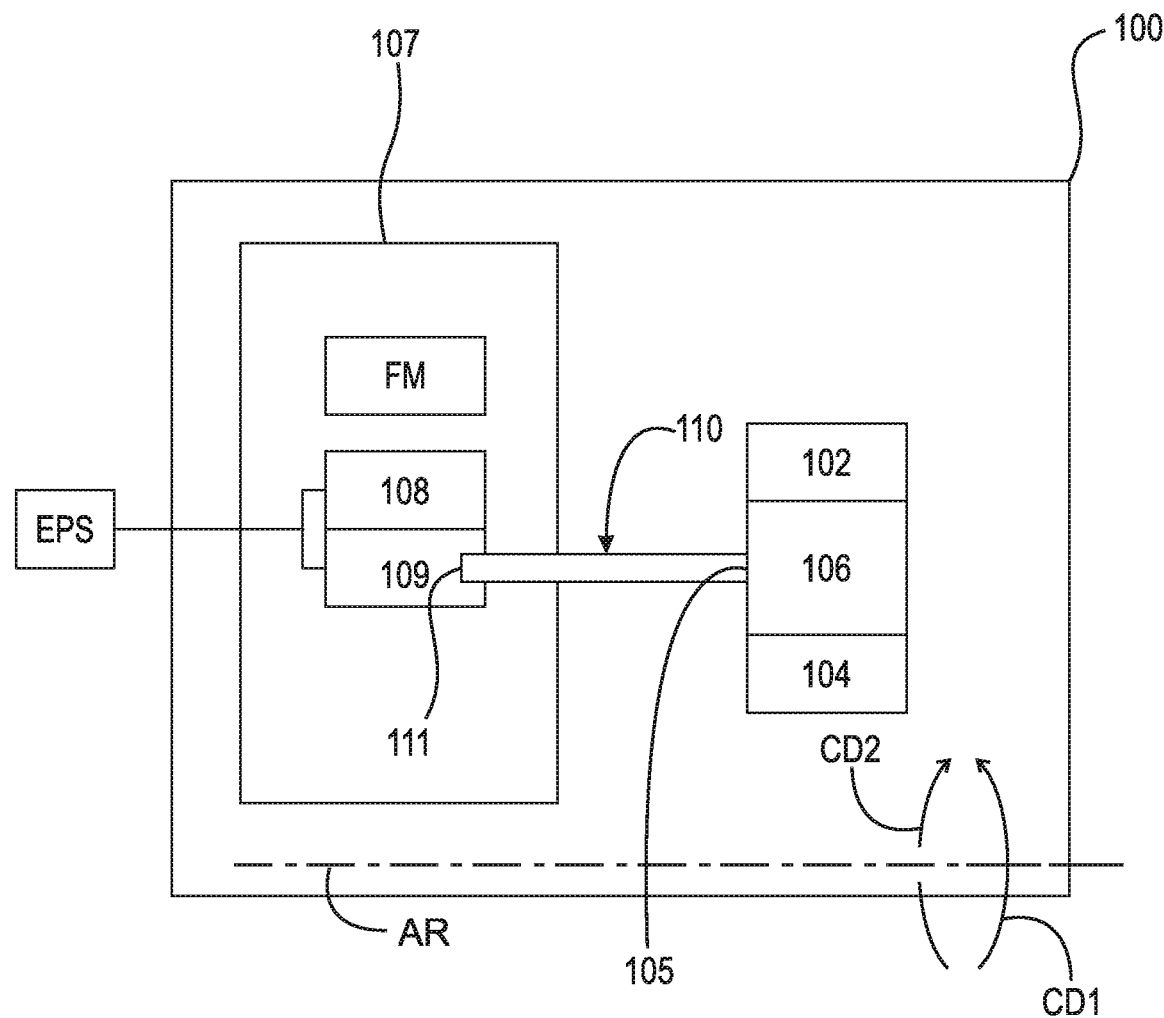
FIG. 1 is a schematic block diagram of a wedge clutch with residual magnetism attenuation.

FIG. 1 is a schematic block diagram of wedge clutch 100 with residual magnetism attenuation.

Figure 2:
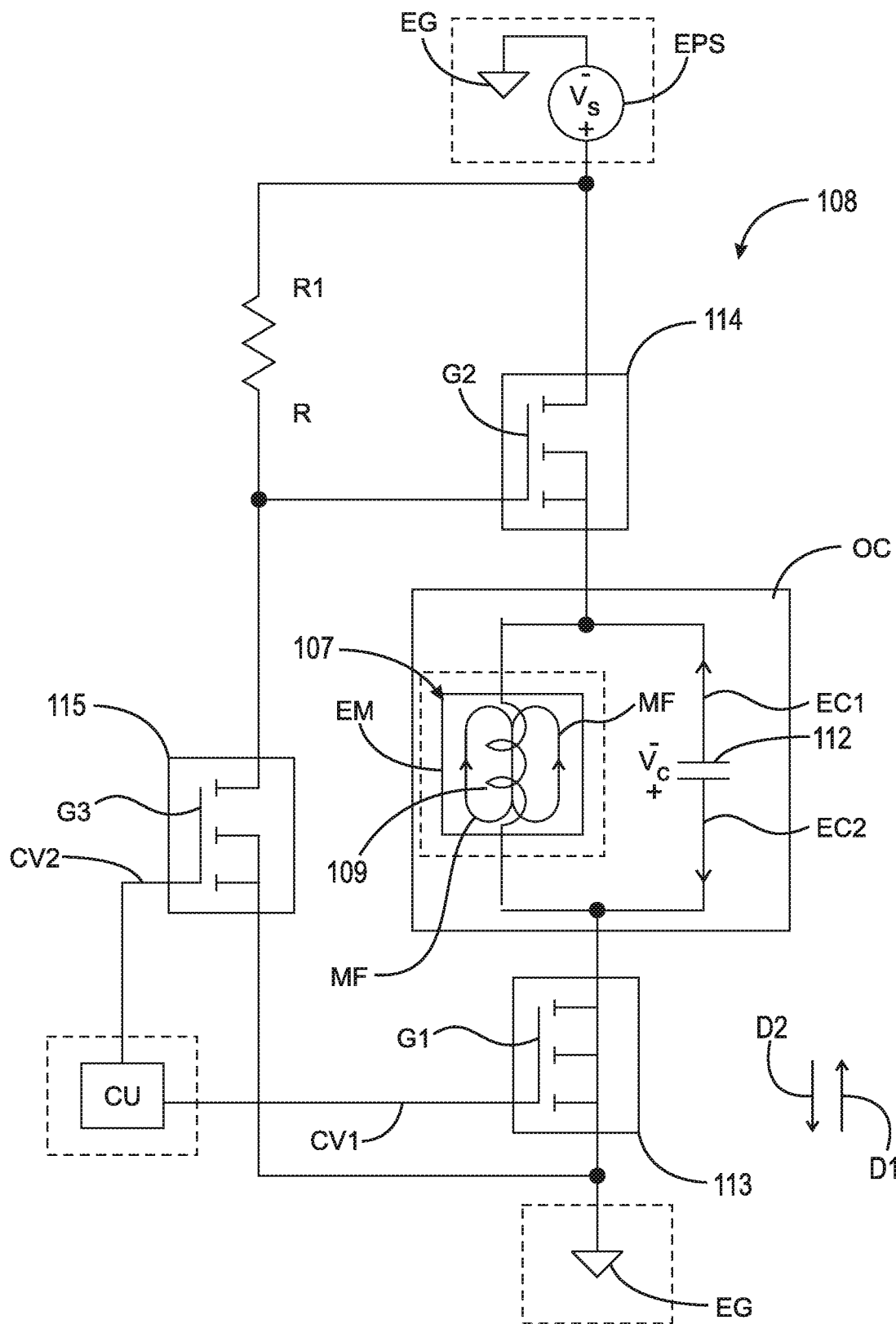
FIG. 2 is a schematic wiring diagram of an attenuating circuit in FIG. 1.

FIG. 2 is a schematic wiring diagram of an attenuating circuit shown in FIG. 1. The following should be viewed in light of FIGS. 1 and 2. Wedge clutch 100 includes: axis of rotation AR; outer race 102; inner race 104; at least one wedge plate 106 radially disposed between inner race 104 and outer race 102; and at least one electromagnetic actuator 107 including attenuating circuit 108. Each electromagnetic actuator 107 includes ferromagnetic material FM and coil 109 arranged to be energized by source voltage Vs from electrical power source EPS to generate magnetic field MF (only partially displayed in FIG. 2). In the example of FIGS. 1 and 2, each electromagnetic actuator 107 includes at least one coil core piece 110 with: at least one end 105 fixedly connected to at least one wedge plate wedge plate 106; and at least one end 111 enclosed by coil 109. The dashed lines in FIG. 2 enclose and designate elements that are connected to circuit 108, but not necessarily included with circuit 108. In an example embodiment (not shown), elements enclosed and designated by the dashed lines in FIG. 2 are included in circuit 108. Note that coil 109 functions as an inductor.

Magnetic field MF displaces at least one wedge plate 106, with respect to outer race 102 or inner race 104, to switch wedge clutch 100 between: a first locked mode of wedge clutch 100; and a first free-wheel mode of wedge clutch 100. In the first locked mode, inner race 104, wedge plate 106, and outer race 102 are non-rotatably connected for rotation of inner race 104 in one of circumferential direction CD1 or opposite circumferential direction CD2. In the first free-wheel mode of wedge clutch 100, inner race 104 is rotatable, with respect to outer race 102, in the one of circumferential direction CD1 or CD2.

Each attenuating circuit 108 includes: capacitor 112 wired in parallel with coil 109 and switch 113 wired to capacitor 112. During the first free-wheel mode of wedge clutch 100: switch 113 is arranged to connect capacitor 112 and coil 109 to electrical ground EG; and electrical power source EPS is arranged to energize coil 109 and charge capacitor 112 with capacitor voltage Vc. Following, or concurrent with, an initiation of the first locked mode: switch 113 is arranged to electrically isolate capacitor 112 and coil 109 from electrical ground EG; and capacitor 112 is arranged to discharge voltage Vc through coil 109.

Following the initiation of the first locked mode, voltage Vc in capacitor 112 and a voltage drop across coil 109 are arranged to alternately drive: electrical current EC1 through coil 109 in direction D1; and electrical current EC2 through coil 109 in direction D2, opposite direction D. Following the initiation of the first locked mode, current EC1 and current EC2: randomize residual magnetic fields in electromagnetic actuator 107 or wedge plate 106; and attenuate residual magnetic saturation in electromagnetic actuator 107 or wedge plate 106. As further described below, when coil 109 and charged capacitor 112 (voltage Vc is present) are isolated from ground EG by switch 113, coil/inductor 109 and capacitor 112 operate as oscillating circuit OC, in which voltage Vc is discharged through currents EC1 and EC2.

In an example embodiment, attenuating circuit 108 includes switch 114. Switch 114: is electrically connected to capacitor 112 and coil 109; and arranged to electrically connect to electrical power source EPS. Following the initiation of the first locked mode, switch 114 is arranged to electrically isolate capacitor 112 and coil 109 from electrical power source EPS.

Figure 3:
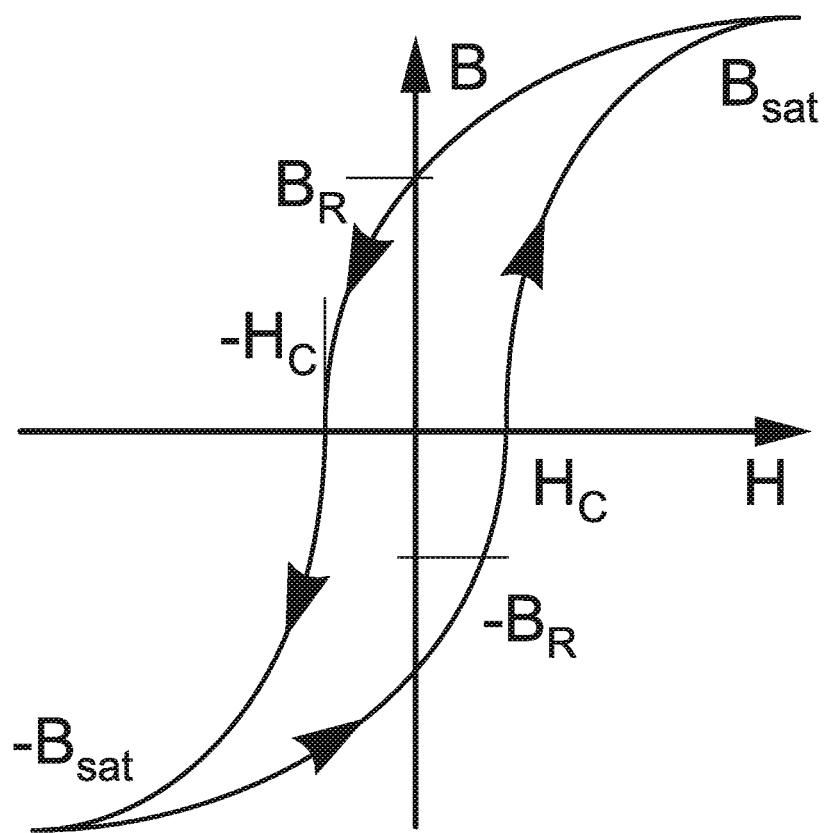
FIG. 3 is a graph of magnetic flux density and magnetic field strength.

FIG. 3 is a graph of magnetic flux density B and magnetic field strength H. The following should be viewed in light of FIGS. 1 through 3. As energy is applied to coil 109, magnetic flux is introduced into material FM, causing magnetic field MF to form. When sufficient power is supplied, magnetic field MF reaches saturation point, B_sat shown in FIG. 3. When the power is removed from coil 109, magnetic field MF in material FM decreases but does not disappear completely. The remaining magnetic field MF is governed by the retentivity, or residual magnetism, of material FM, shown as B_r in FIG. 3. This residual field MF can be detrimental to the operation of some devices. For example as further described below, residual field MF can prevent proper operation of actuator 107.

Attenuating (continuously decreasing) alternating current currents EC1 and EC2 through coil 109 create a constantly reversing flux field in ferromagnetic material FM. In FIG. 2, the direction (direction D1) of magnetic field MF corresponds to current EC1. The attenuating and reversing flux fields randomize the magnetic orientation of material FM, removing residual magnetization in material FM. As noted above, when power is removed from coil 109, oscillating circuit OC oscillates and randomizes the magnetic domains in material FM as energy in the form of heat generated by the electrical resistance of coil 109 and currents EC1 and EC2 passing through coil 109. Capacitor 112 can be selected to generate a desired frequency of oscillations for a particular size of coil 109, to completely remove the residual magnetism noted above.

Figure 4:
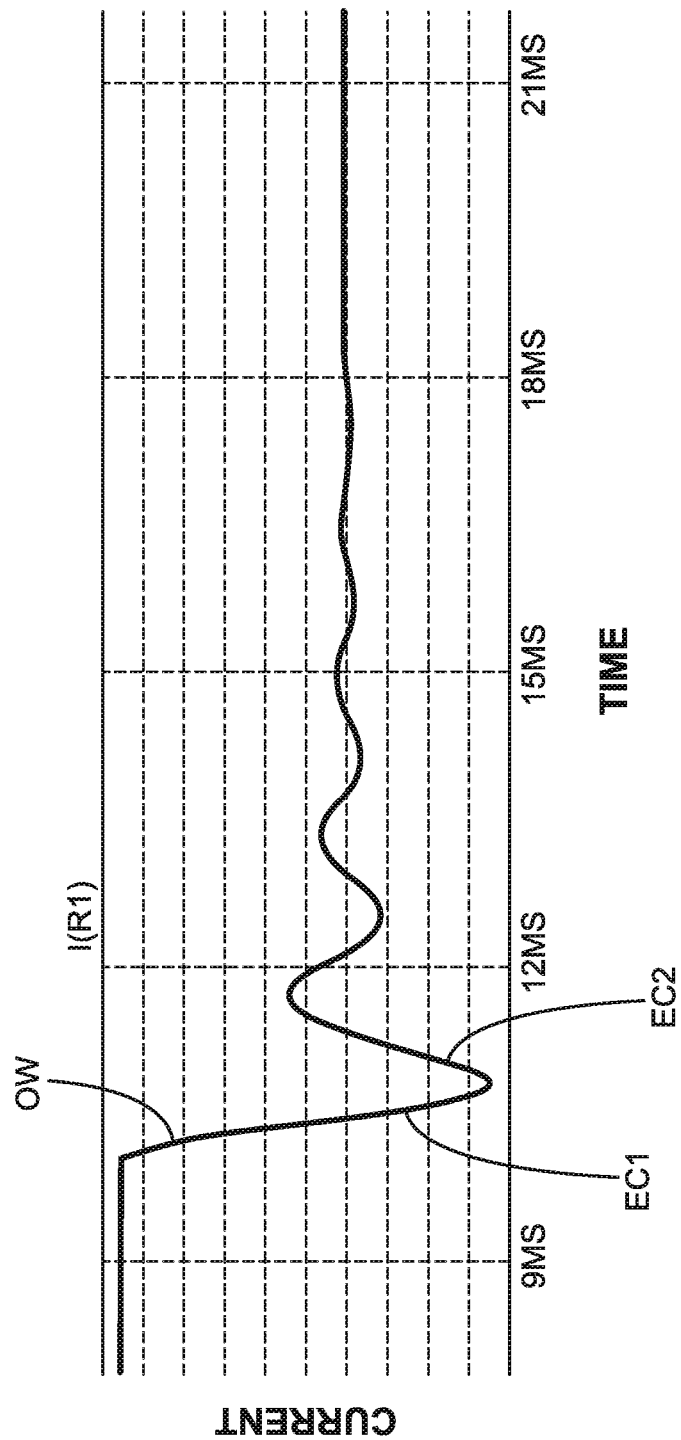
FIG. 4 is a graph of electrical current through a coil and time, showing an oscillating waveform.

FIG. 4 is a graph of electrical current through coil 109 (current EC1 and EC2 on the Y axis) and time (X axis) showing oscillating waveform OW. The following should be viewed in light of FIGS. 1 through 4. When oscillating circuit OC begins oscillating: coil 109 attempts to maintain a constant current through coil 109, while capacitor 112 attempts to maintain a constant voltage Vc. For example, coil 109 pushes current EC1 in direction D1, thus inducing a voltage drop across coil 109. Capacitor 112 opposes the voltage drop by driving current EC2 in opposite direction D2. The oscillating push and pull of currents EC1 and EC2 between coil 109 and capacitor 112 continues until power in coil 109 and capacitor 112 is dissipated as heat through the electrical resistance of coil 109.

No control or intervention is required to generate the waveform in FIG. 4 once switches 113 and 114 are opened. That is, the oscillating push and pull of currents EC1 and EC2 between coil 109 and capacitor 112 begins when switch 113 is opened and continues without further active control. The electrical resistance of coil 109 determines the decay time of the oscillations in FIG. 4. Increasing the resistance increases the speed at which waveform OW decreases to zero. In cases in which the resistance and inductance of coil 109 are fixed to accommodate other design considerations of actuator 107, capacitance values for capacitor 112 are selectable to achieve a desired oscillation frequency and decay time. Thus, circuit 108 has the modularity for removing residual magnetism in many sizes of motor or solenoid systems.

In an example embodiment, switch 113 is an n-type transistor (either an npn or n-MOSFET). In the discussion that follows, 'transistor 113' is used in place of 'switch 113.' Applying control voltage CV1 from control unit CU (part of the vehicle or system including actuator 107 and circuit 108) to gate G1 of transistor 113 switches transistor 113 on, creating a current path from coil 109 to ground EG. The current path enables current to flow through coil 109, creating magnetic field MF. Removing control voltage CV1 from gate G1 switches off transistor 113, disrupting the current path through coil 109 to ground EG.

Thus, when switched off, transistor 113 isolates coil 109/capacitor 112 and oscillating circuit OC from ground EG. Once isolated from ground EG, oscillating circuit OC begins oscillating as described above to create currents EC1 and EC2. Thus, there is no loss of the power in oscillating circuit OC through bleeding into ground EG. That is, a maximum amount of the power in oscillating circuit OC is available for creating the attenuating and reversing flux fields noted above.

In an example embodiment, switch 114 is a p-type transistor (pnp or PMOS). In the discussion that follows, 'transistor 114' is used in place of 'switch 114.' By switching transistor 114 on, current flow through coil 109 is enabled as transistor 114 is switched on. By switching off transistor 114, power source EPS is isolated from coil 109, providing additional circuit protection and isolation when transistor 113 is switched off. In an example embodiment, n-type transistor 115 is wired to gate G2 of transistor 114 to enable easier switching of transistor 114. In general, control voltages, such as CV1, are less than voltage Vs. Transistor 115 is switched on by control voltage CV2, at gate G3 of transistor 115, less than voltage Vs from source EPS. When voltage at gate G2 equals voltage Vs, transistor 114 is switched off.

As noted above, to switch coil 109 on, transistor 114 is switched on. To switch transistor 114 on, control voltage CV2 is applied to gate G3, switching transistor 115 on, creating a ground path from gate G2, such that voltage at gate G2 is less than voltage Vs. Removing control voltage CV2 from gate G3 switches transistor 115 off, isolating gate G2 from ground and applying voltage Vs to gate G2 to switch transistor 114 off. In an example embodiment, resistor R1 with value R is added to circuit 108 to provide a voltage drop path.

Figure 5:
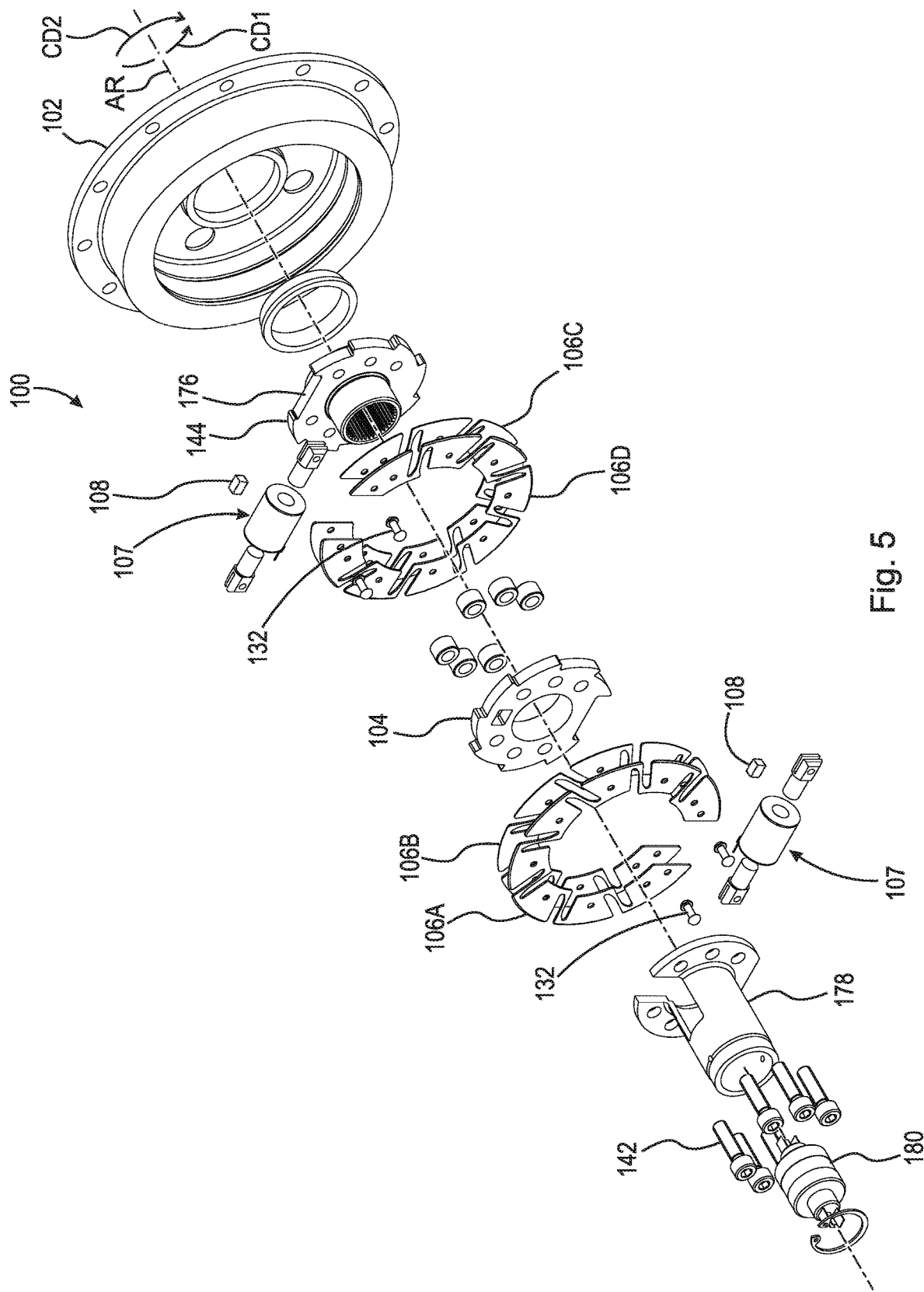
FIG. 5 is an exploded view of an example wedge clutch with residual magnetism attenuation shown in FIG. 1.

FIG. 5 is an exploded view of example wedge clutch 100 with residual magnetism attenuation shown in FIG. 1.

Figure 6:
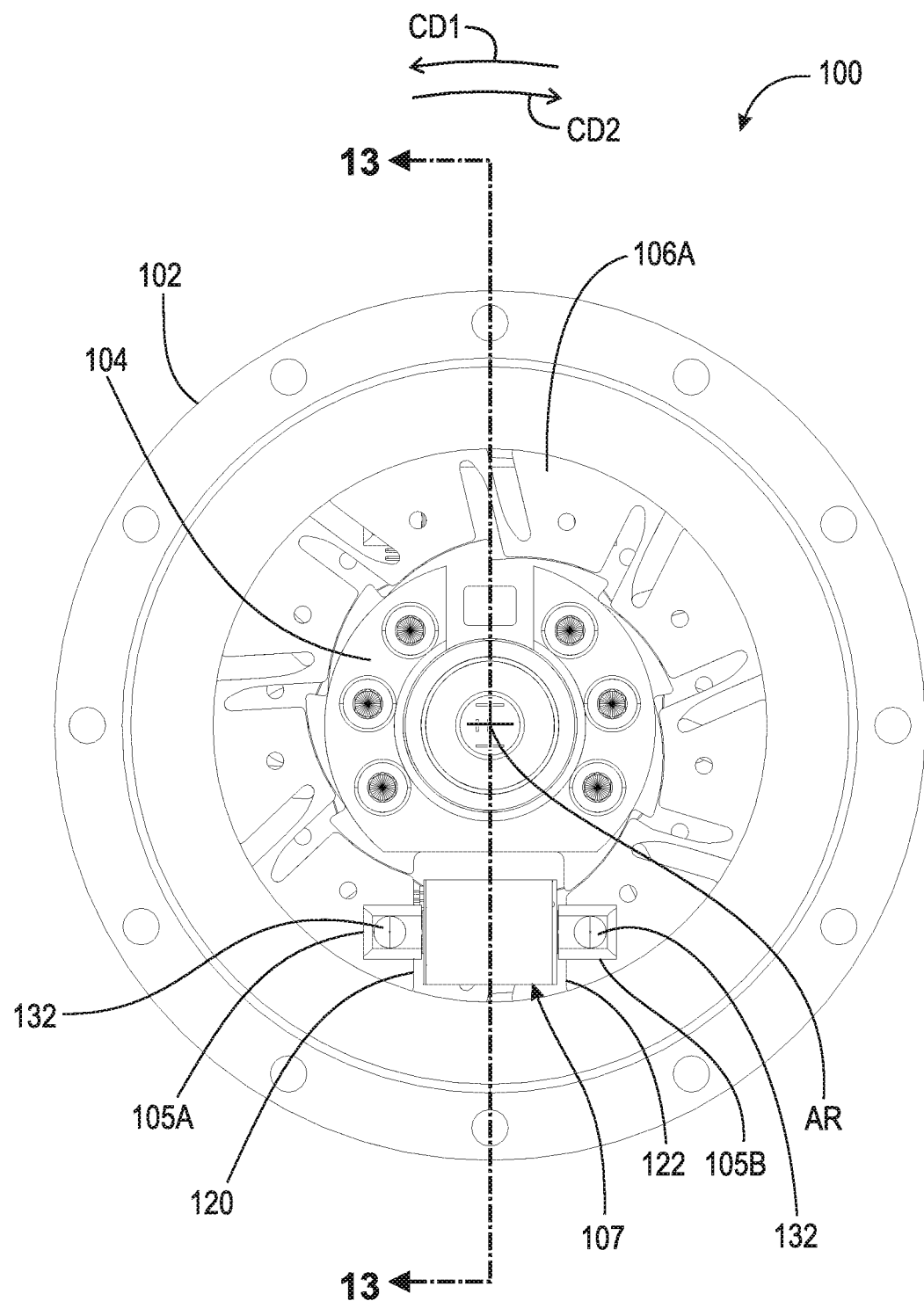
FIG. 6 is a front view of the wedge clutch with residual magnetism attenuation shown in FIG. 5.

FIG. 6 is a front view of wedge clutch 100 with residual magnetism attenuation shown in FIG. 5.

Figure 7:
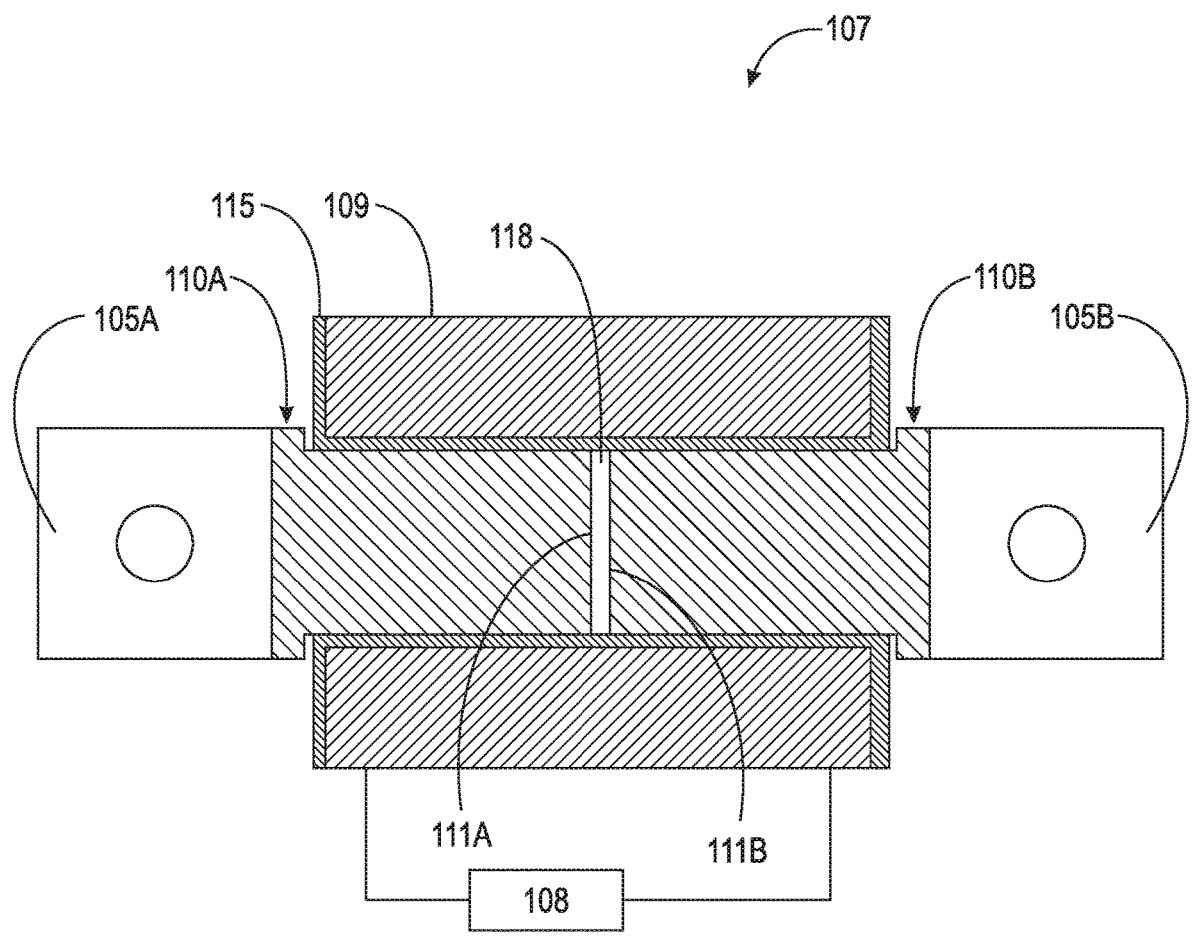
FIG. 7 is a cross-sectional view of an electromagnetic actuator of the wedge clutch with residual magnetism attenuation shown in FIG. 5.

FIG. 7 is a cross-sectional view of electromagnetic actuator 107A shown in FIG. 5. The following should be viewed in light of FIGS. 1 through 7. Wedge clutch 100 includes: axis of rotation AR; outer race 102; inner race 104; wedge plates 106A and 106B; and electromagnetic actuator 107A. Wedge plates 106A and 106B are radially disposed between inner race 104 and outer race 102. In an example embodiment, wedge plates 106A and 106B includes slots SL1 extending radially inwardly from radially outer circumference ROC and slots SL2 extending radially outwardly from radially inner circumference RIC. Attenuating circuit 108 for actuator 107A is schematically presented in FIG. 5. An actual configuration and position of circuit 108 is dependent at least in part upon the configuration of the electrical system powering actuator 107A. In general, a reference character "[digit][digit][digit][letter]" designates a specific example of an element labeled as "[digit] [digit][digit]." For example, wedge plate 106A is a specific example from among wedge plates 106.

In the example of FIG. 5, electromagnetic actuator 107A includes coil 109; bobbin 115; coil core piece 110A; and coil core piece 110B. Coil core piece 110A includes: end 111A disposed within coil 109; and end 105A connected to wedge plates 106A and 106B. Coil core piece 110B includes: end 111B disposed within coil 109; and end 105B connected to wedge plates 106A and 106B. To accommodate the radially inward displacement and radial contraction of wedge plates 106A and 106B described below, ends 111A and 111B are separated by air gap 118.

In the example of FIG. 5, inner race 104 is arranged to receive rotational torque. In a first locked mode of wedge clutch 100, inner race 104, wedge plates 106A and 106B, and outer race 102 are non-rotatably connected for rotation of inner race 104 in circumferential direction CD1. In a first free-wheel mode of wedge clutch 100, inner race 104 is rotatable, with respect to the outer race 102, in circumferential direction CD1. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

To transition from the first locked mode to the first free-wheel mode, electromagnetic actuator 107A is arranged to be energized to: draw ends 111A and 111B toward each other; displace wedge plates 106A and 106B radially inwardly; and radially contract wedge plates 106A and 106B. To transition from the first free-wheel mode to the first locked mode: electromagnetic actuator 107A is arranged to be de-energized; and wedge plates 106A and 106B are arranged to expand radially outwardly to initiate or increase frictional contact between wedge plates 106A and 106B and outer race 102. For example, wedge plates 106A and 106B are preloaded with a radially outwardly expanding force that is overcome by electromagnetic actuator 107A to transition to the first free-wheel mode, and which results in the radial expansion characterizing the transition to the first locked mode.

Figure 8:
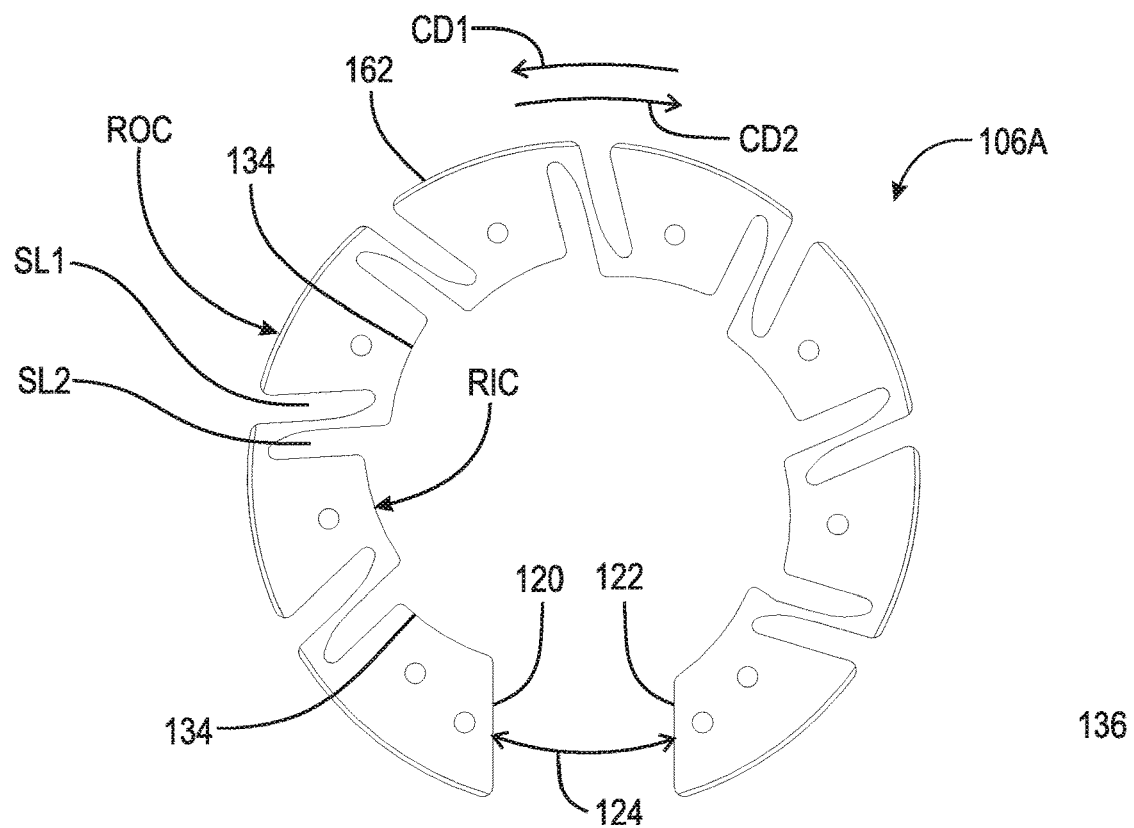
FIG. 8 is a front view of a wedge plate of the wedge clutch with residual magnetism attenuation shown in FIG. 5.

FIG. 8 is a front view of wedge plate 106A of wedge clutch 100 with residual magnetism attenuation shown in FIG. 5. The following should be viewed in light of FIGS. 1 through 8. Wedge plate 106A includes: circumferential end 120; and circumferential end 122. Wedge plate 106A is discontinuous between end 120 and end 122. For example, ends 120 and 122 are separated by gap 124 in circumferential direction CD1. End 105A of coil core piece 110A of electromagnetic actuator 107A is fixedly connected to circumferential end 120. End 105B of coil core piece 110B of electromagnetic actuator 107A is fixedly connected to circumferential end 128.

Figure 9:
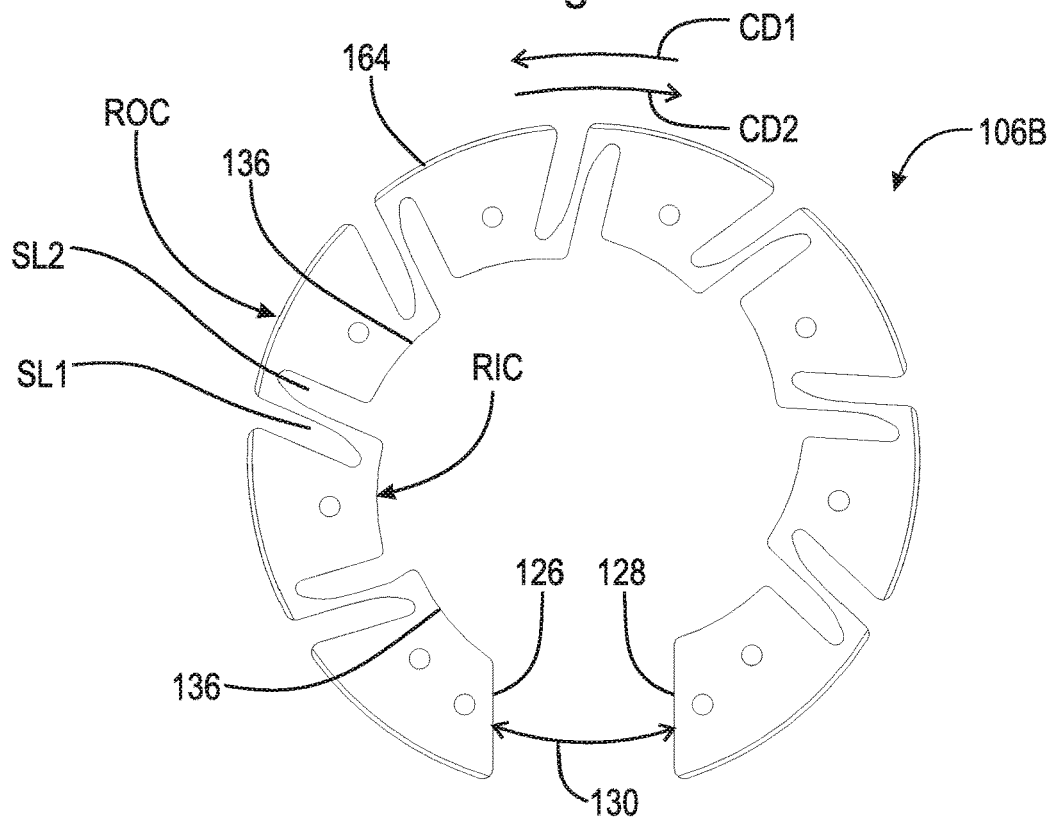
FIG. 9 is a front view of a wedge plate of the wedge clutch with residual magnetism attenuation shown in FIG. 5.

FIG. 9 is a front view of wedge plate 106B of wedge clutch 100 with residual magnetism attenuation shown in FIG. 5. The following should be viewed in light of FIGS. 1 through 9. Wedge plate 106B includes: circumferential end 126; and circumferential end 128. Wedge plate 106B is discontinuous between end 126 and end 128. For example, ends 126 and 128 are separated by gap 130 in circumferential direction CD1. End 105A of coil core piece 110A of electromagnetic actuator 107A is fixedly connected to circumferential end 126. End 105B of coil core piece 110B of electromagnetic actuator 107A is fixedly connected to circumferential end 128. In an example embodiment, end 105A of coil core piece 110A is fixedly connected to circumferential ends 120 and 126 with a bolt 132 and end 105B of coil core piece 110B is fixedly connected to circumferential ends 122 and 128 with a bolt 132. However, it should be understood that any means known in the art can be used to fixedly connect coil core pieces 110A and 110B to wedge plates 106A and 106B.

To transition from the first locked mode to the first free-wheel mode, electromagnetic actuator 107A is arranged to be energized to: bring circumferential end 120 and circumferential end 122 toward each in circumferential direction CD1 or circumferential direction CD2, opposite circumferential direction CD1; and bring circumferential end 126 and circumferential end 128 toward each in circumferential direction CD1 or circumferential direction CD2. Stated otherwise, electromagnetic actuator 107A is arranged to be energized to decrease gaps 124 and 130.

Figure 10:
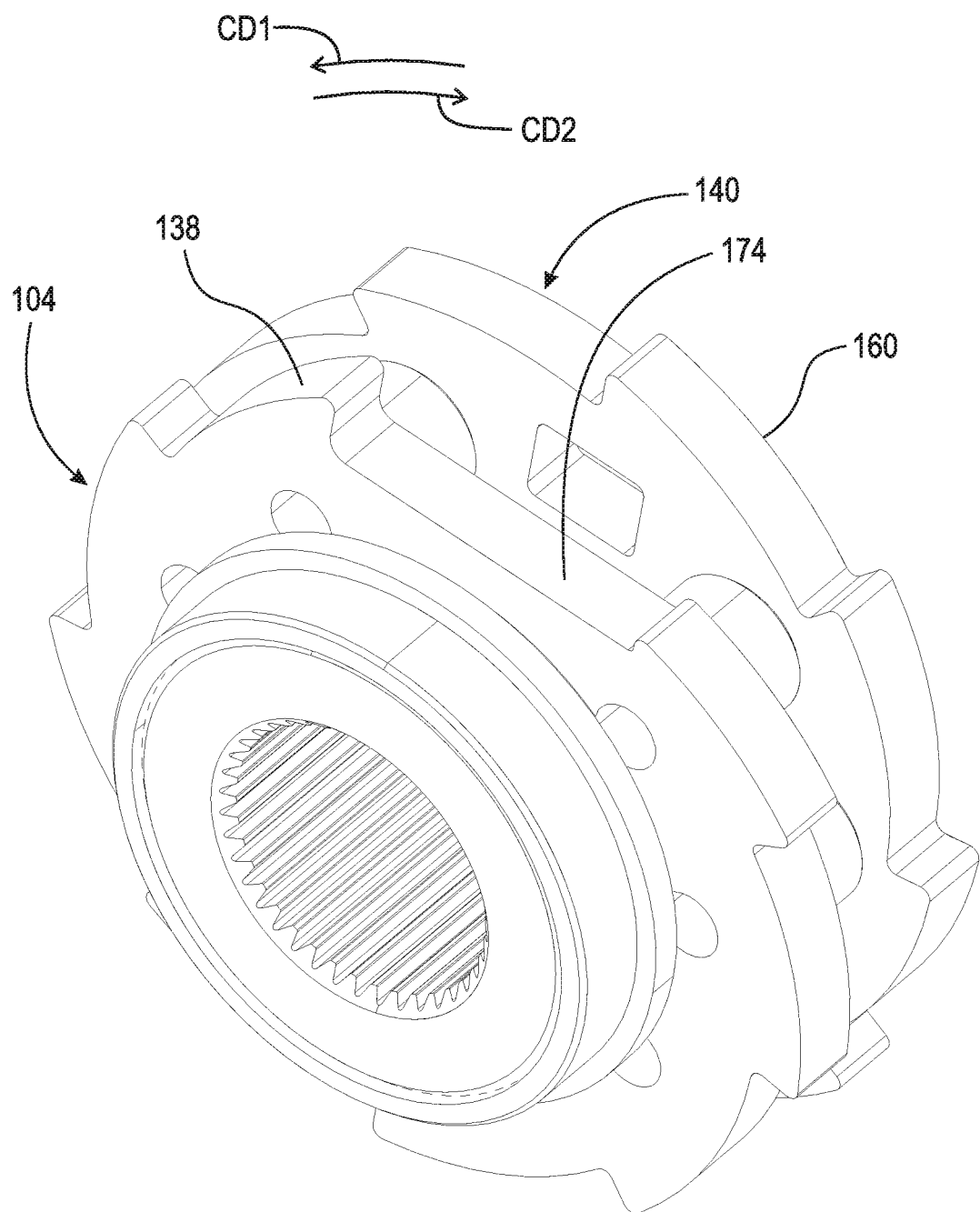
FIG. 10 is a front view of inner races of the wedge clutch with residual magnetism attenuation shown in FIG. 5.

FIG. 10 is a front view of inner races of wedge clutch 100 with residual magnetism attenuation shown FIG. 5. The following should be viewed in light of FIGS. 1 through 10. Wedge plate 106A includes ramps 134. Wedge plate 106B includes ramps 136. Inner race 104 includes ramps 138. Each ramp 134 is in contact with a respective ramp 138. Each ramp 136 is in contact with a respective ramp 138. Each ramp 134, each ramp 136, and each ramp 138 slope radially inwardly in circumferential direction CD1. To transition from the first locked mode to the first free-wheel mode, electromagnetic actuator 107A is arranged to: slide at least one ramp 134 radially inwardly along at least one ramp 138; and slide at least one ramp 136 radially inwardly along at least one ramp 138.

Figure 11:
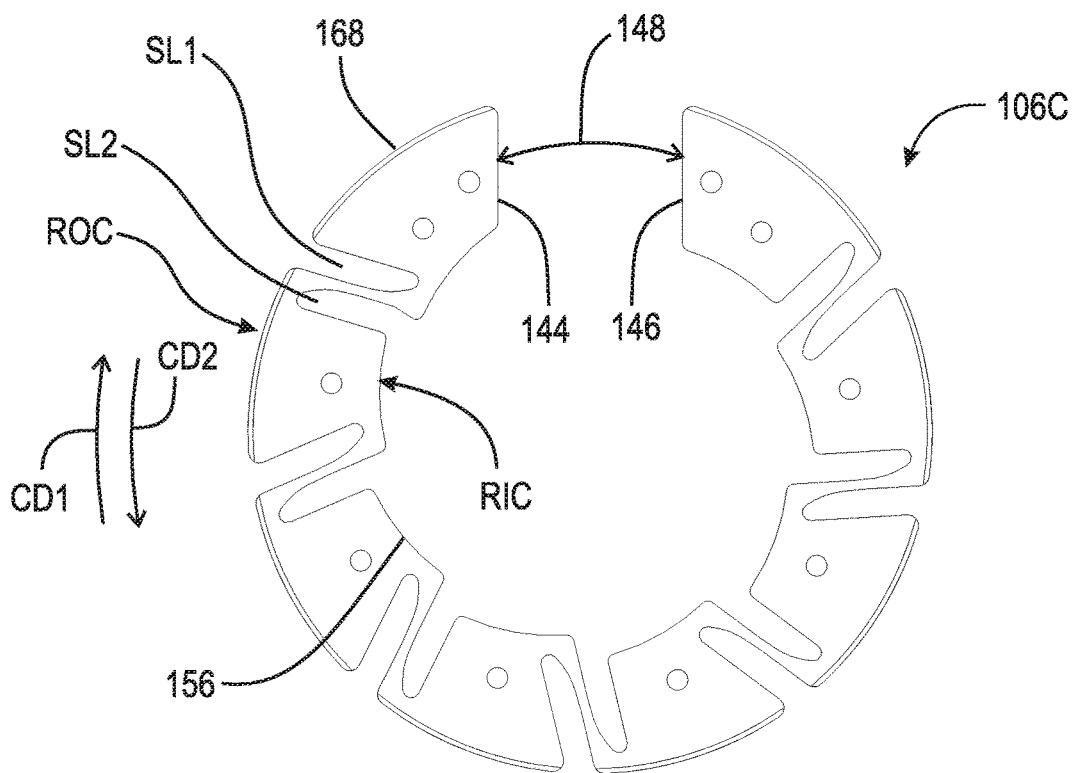
FIG. 11 is a back view of a wedge plate of the wedge clutch with residual magnetism attenuation shown in FIG. 5.

FIG. 11 is a back view of wedge plate 106C of wedge clutch 100 with residual magnetism attenuation shown in FIG. 5.

Figure 12:
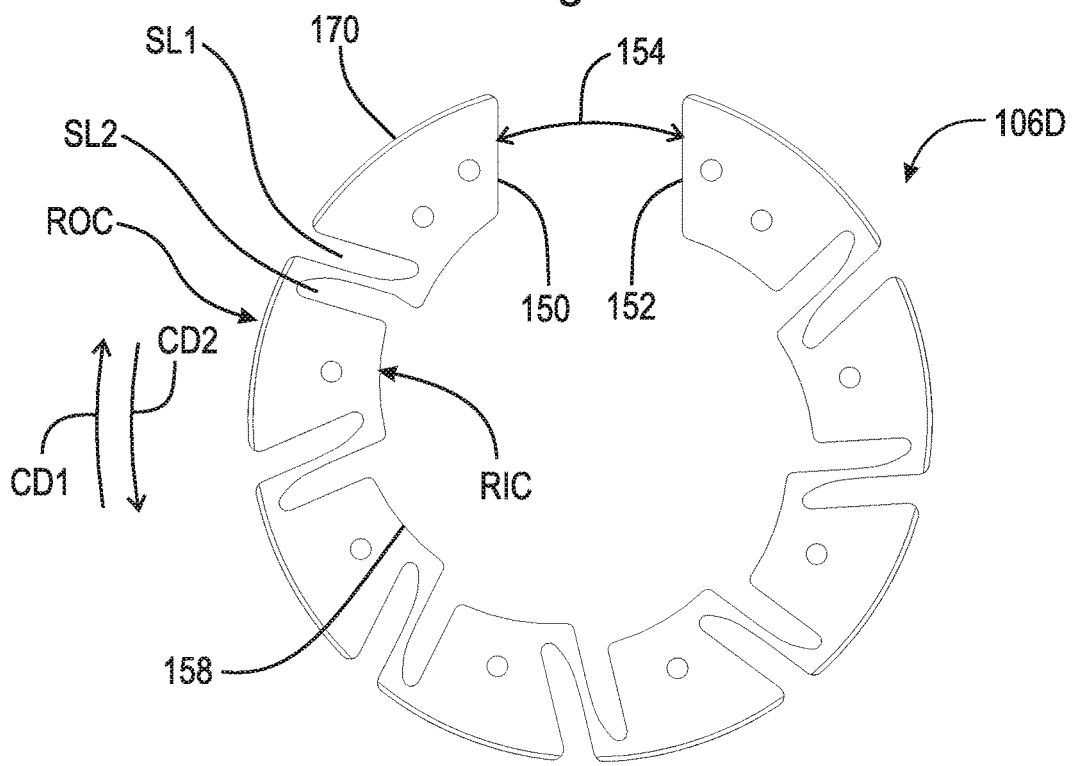
FIG. 12 is a back view of a wedge plate of the wedge clutch with residual magnetism attenuation shown in FIG. 5.

FIG. 12 is a back view of wedge plate 106D of wedge clutch 100 with residual magnetism attenuation shown FIG. 5. The following should be viewed in light of FIGS. 1 through 12. In an example embodiment, wedge clutch 100 includes: inner race 140 non-rotatably connected to inner race 104 with bolts 142; wedge plates 106C and 106D; and electromagnetic actuator 107B. Any means known in the art can be used to non-rotatably connect inner races 104 and 140. In an example embodiment (not shown), inner races 104 and 140 are a single monolithic structure. Wedge plates 106C and 106D are radially disposed between inner race 140 and outer race 102. The discussion for actuator 107A is applicable to actuator 107B unless noted otherwise.

In an example embodiment, wedge plates 106C and 106D includes slots SL1 extending radially inwardly from radially outer circumference ROC and slots SL2 extending radially outwardly from radially inner circumference RIC. Ends 105A and 105B of actuator 107B are connected to wedge plates 106C and 106D.

In a second locked mode of wedge clutch 100, inner race 140, wedge plates 106C and 106D, and outer race 102 are non-rotatably connected for rotation of inner race 140 in circumferential direction CD2. In a second free-wheel mode of wedge clutch 100, inner race 140 is rotatable, with respect to outer race 102, in circumferential direction CD2.

To transition from the second locked mode to the second free-wheel mode, electromagnetic actuator 107B is arranged to be energized to: draw ends 111A and 111B of actuator 107B toward each other; displace wedge plates 106C and 106D radially inwardly; and radially contract wedge plates 106C and 106D. To transition from the second free-wheel mode to the second locked mode: electromagnetic actuator 107 is arranged to be de-energized; and wedge plates 106C and 106D are arranged to expand radially outwardly to initiate or increase frictional contact between wedge plates 106C and 106D and outer race 102. For example, wedge plates 106C and 106D are preloaded with a radially outwardly expanding force that is overcome by electromagnetic actuator 107B to transition to the second free-wheel mode, and which results in the radial expansion characterizing the transition to the second locked mode.

Wedge plate 106C includes: circumferential end 144; and circumferential end 146. Wedge plate 106C is discontinuous between end 144 and end 146. For example, ends 144 and 146 are separated by gap 148 in circumferential direction CD1. End 105A of coil core piece 110A of electromagnetic actuator 107B is fixedly connected to circumferential end 144. End 105B of coil core piece 110BB of electromagnetic actuator 107B is fixedly connected to circumferential end 146. In an example embodiment, end 105A is fixedly connected to circumferential end 144 with bolt 132 and end 105B is fixedly connected to circumferential end 146 with bolt 132. However, it should be understood that any means known in the art can be used to fixedly connect end 105A of coil core piece 110A to circumferential end 144 and to fixedly connect end 105B of coil core piece 110B to circumferential end 146.

Wedge plate 106D includes: circumferential end 150; and circumferential end 152. Wedge plate 106D is discontinuous between end 150 and end 152. For example, ends 150 and 152 are separated by gap 154 in circumferential direction CD1. End 105A of coil core piece 110A of electromagnetic actuator 107B is fixedly connected to circumferential end 150. End 105B of coil core piece 110B of electromagnetic actuator 107B is fixedly connected to circumferential end 152. In an example embodiment, end 105A of coil core piece 110A is fixedly connected to circumferential end 150 with bolt 132 and end 105B of coil core piece 110B is fixedly connected to circumferential end 152 with bolt 132. However, it should be understood that any means known in the art can be used to fixedly connect end 105A to circumferential end 150 and to fixedly connect end 105B to circumferential end 152.

To transition from the second locked mode to the second free-wheel mode, electromagnetic actuator 107B is arranged to be energized to: bring circumferential end 144 and circumferential end 146 toward each in circumferential direction CD1 or circumferential direction CD2; and bring circumferential end 150 and circumferential end 152 toward each in circumferential direction CD1 or circumferential direction CD2. Stated otherwise, electromagnetic actuator 107B is arranged to be energized to decrease gaps 148 and 154.

Wedge plate 106C includes ramps 156, wedge plate 106D includes ramps 158, and inner race 140 includes ramps 160. Each ramp 156 is in contact with a respective ramp 160. Each ramp 158 is in contact with a respective ramp 160. Each ramp 156, each ramp 158, and each ramp 160, slope radially inwardly in circumferential direction CD2. To transition from the second locked mode to the second free-wheel mode, electromagnetic actuator 107B is arranged to: slide at least one ramp 156 radially inwardly along at least one ramp 160; and slide at least one ramp 158 radially inwardly along at least one ramp 160.

Figure 13:
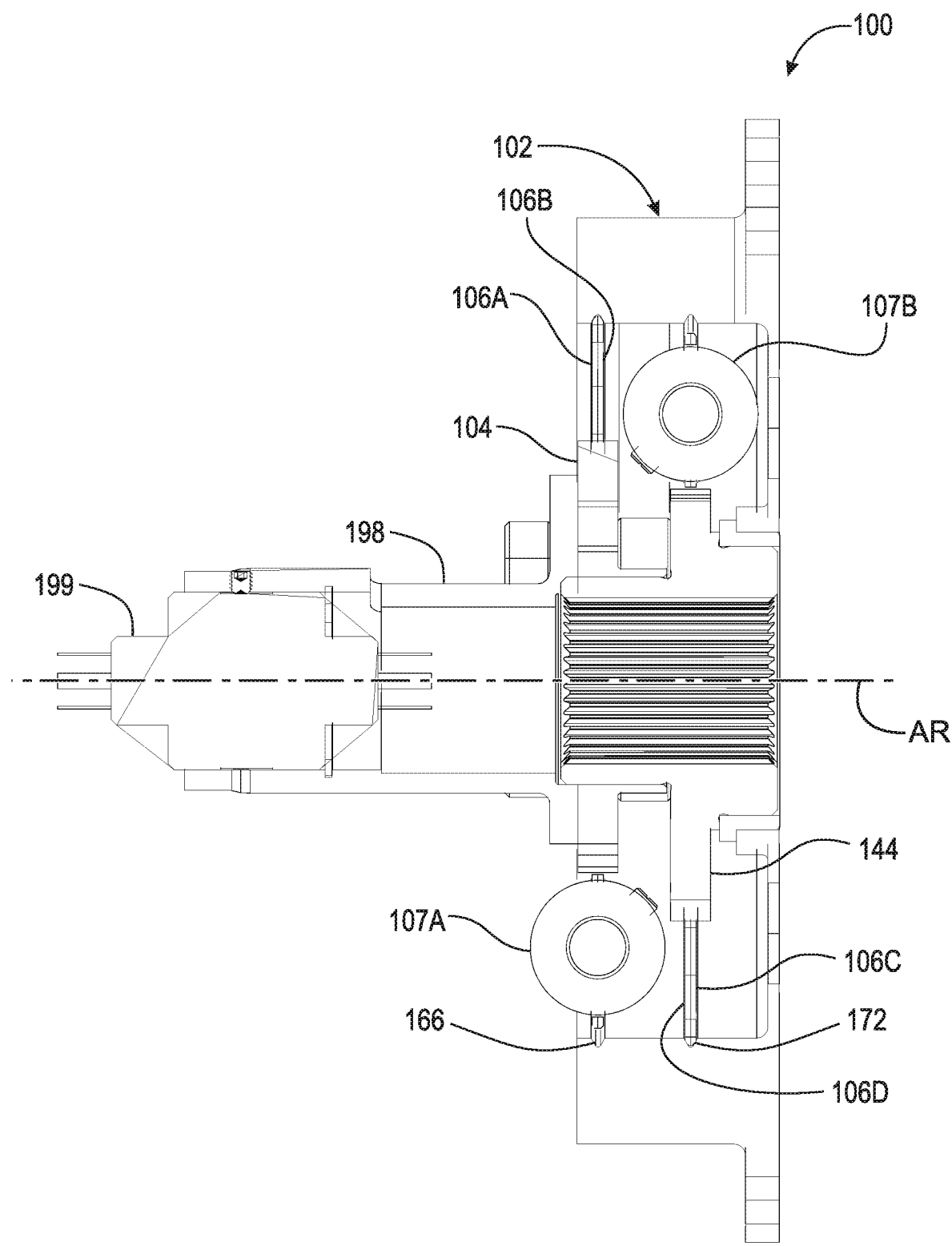
FIG. 13 is a cross-sectional view generally along line 13-13 in FIG. 6.

FIG. 13 is a cross-sectional view generally along line 13-13 in FIG. 6. The following should be viewed in light of FIGS. 1 through 13. In an example embodiment: wedge plate 106A includes chamfer 162; wedge plate 106B includes chamfer 164; and inner race 104 includes groove 166. Chamfers 162 and 164 are disposed at least partly in groove 166. In an example embodiment: wedge plate 106C includes chamfer 168; wedge plate 106D includes chamfer 170; and inner race 140 includes groove 172. Chamfers 168 and 170 are disposed at least partly in groove 172. In an example embodiment: inner race 104 includes slot 174, in which actuator 107A is located; and inner race 140 includes slot 176, in which actuator 107B is located. Electrical power is supplied to electromagnetic actuators 107A and 107B by any means known in the art. In an example embodiment, clutch 100 includes slip ring retainer 178 and slip ring 180 for supplying electrical power to electromagnetic actuators 107A and 107B.

Figure 14:
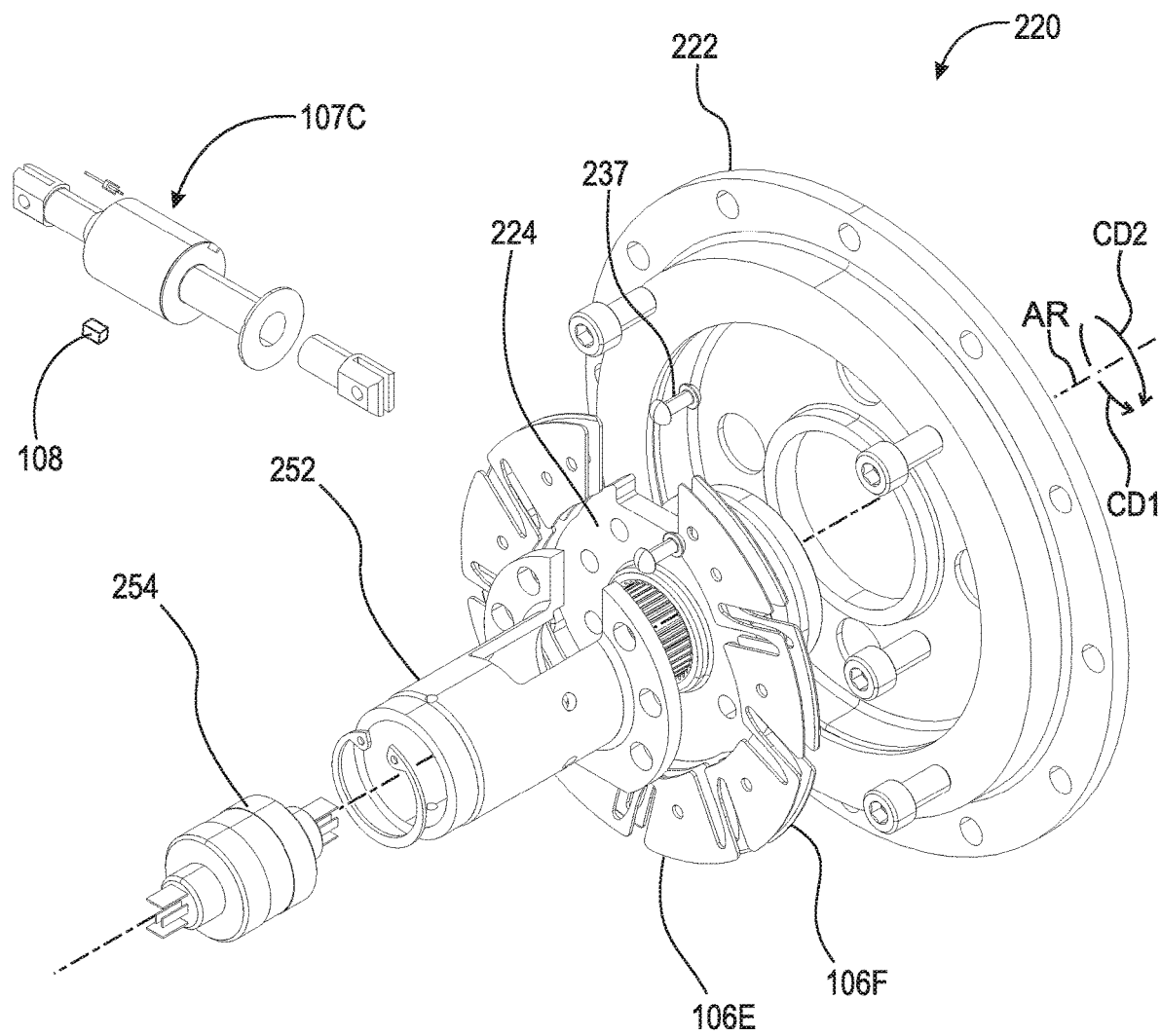
FIG. 14 is an exploded view of an example wedge clutch with residual magnetism attenuation.

FIG. 14 is an exploded view of example wedge clutch 220 with residual magnetism attenuation. Wedge clutch 220 includes: axis of rotation AR; outer race 222; inner race 224; wedge plates 106E and 106F; and electromagnetic actuator 107C including attenuating circuit 108. Wedge plates 106E and 106F are radially disposed between inner race 224 and outer race 222. In the example of FIG. 14, inner race 224 is arranged to receive rotational torque. The discussion for electromagnetic actuator 107A is applicable to electromagnetic actuator 107C in FIG. 14. Attenuating circuit 108 for actuator 107C is schematically presented in FIG. 14. An actual configuration and position of circuit 108 is dependent at least in part upon the configuration of the electrical system powering actuator 107C.

Figure 15:
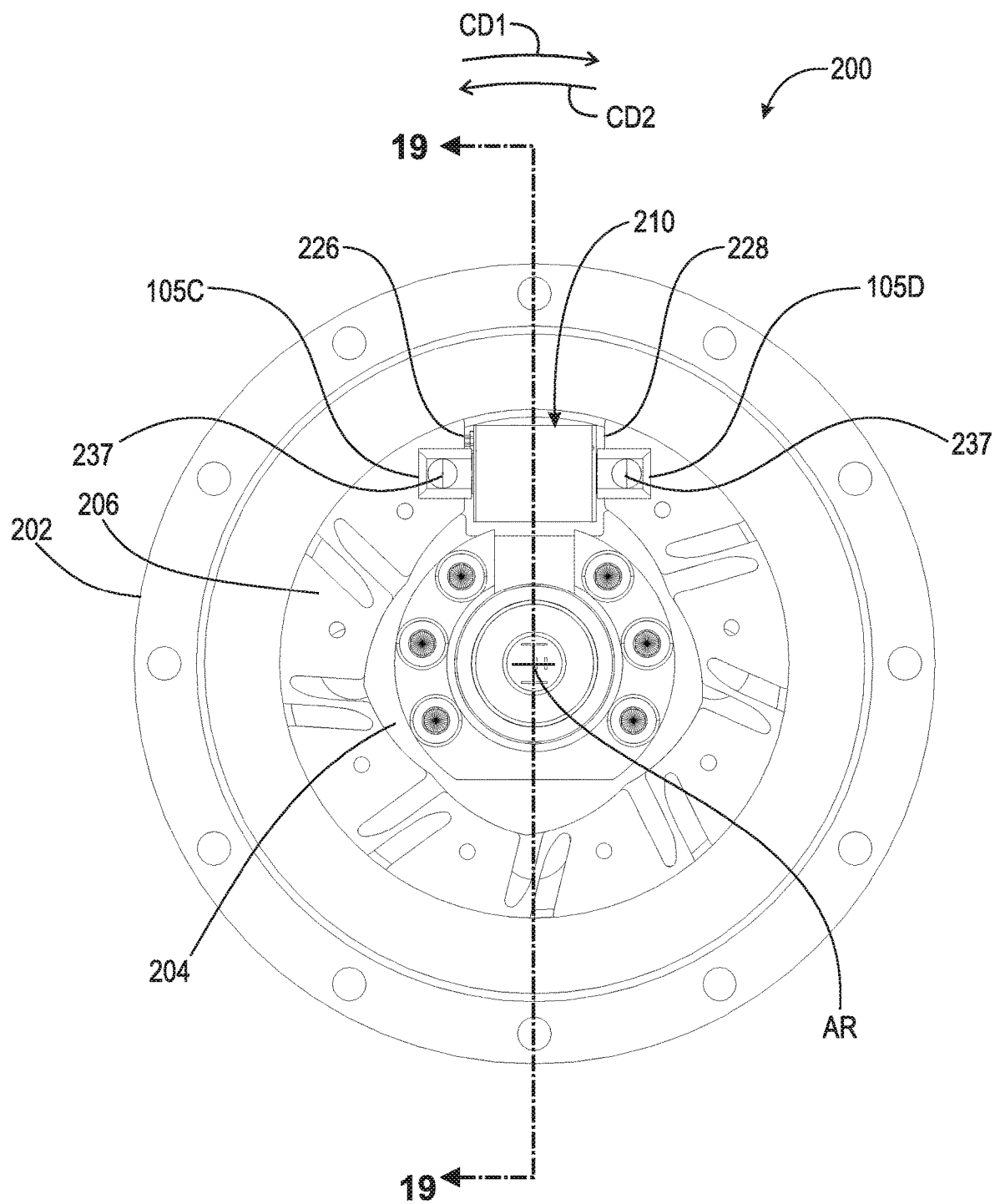
FIG. 15 is a front view of the wedge clutch with residual magnetism attenuation shown in FIG. 14.
Figure 16:
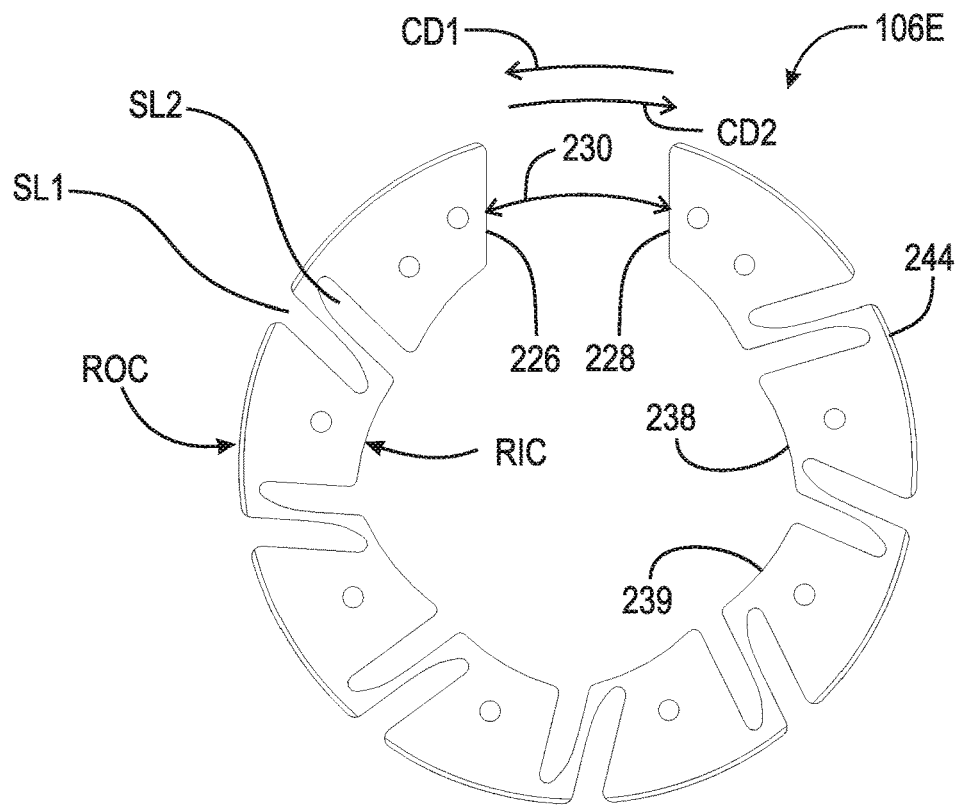
FIG. 16 is a front view of a wedge plate of the wedge clutch with residual magnetism attenuation shown in FIG. 14.

FIG. 15 is a front view of wedge clutch 220 with residual magnetism attenuation shown in FIG. 14;

FIG. 16 is a front view of wedge plate 106E of wedge clutch 220 with residual magnetism attenuation shown FIG. 14. The following should be viewed in light of FIGS. 14 through 16. In an example embodiment, wedge plates 106E and 106F includes slots SL1 extending radially inwardly from radially outer circumference ROC and slots SL2 extending radially outwardly from radially inner circumference RIC. End 105A of actuator 107C is connected to wedge plates 106E and 106F. End 105B of actuator 107C is connected to wedge plates 106E and 106F.

In a locked mode of wedge clutch 220, inner race 224, wedge plates 106E and 106F, and outer race 222 are non-rotatably connected for rotation of inner race 224 in circumferential direction CD1 or in circumferential direction CD2. In a free-wheel mode of wedge clutch 220, inner race 224 is rotatable, with respect to outer race 222 in circumferential direction CD1 or in circumferential direction CD2.

To transition from the locked mode to the free-wheel mode, electromagnetic actuator 107C is arranged to be energized to: draw ends 111A and 111B of actuator 107C toward each other; displace wedge plates 106E and 106F radially inwardly; and radially contract wedge plates 106E and 106F. To transition from the free-wheel mode to the locked mode: electromagnetic actuator 107C is arranged to be de-energized; and wedge plates 106E and 106F are arranged to expand radially outwardly to initiate or increase frictional contact between wedge plates 106E and 106F and outer race 222. For example, wedge plates 106E and 106F are preloaded with a radially outwardly expanding force that is overcome by electromagnetic actuator 107C to transition to the free-wheel mode, and which results in the radial expansion characterizing the transition to the locked mode.

Wedge plate 106E includes: circumferential end 226; and circumferential end 228. Wedge plate 106E is discontinuous between end 226 and end 228. For example, ends 226 and 228 are separated by gap 230 in circumferential direction CD1. End 105A of coil core piece 110A is fixedly connected to circumferential end 226. End 105B of coil core piece 110B is fixedly connected to circumferential end 228.

Figure 17:
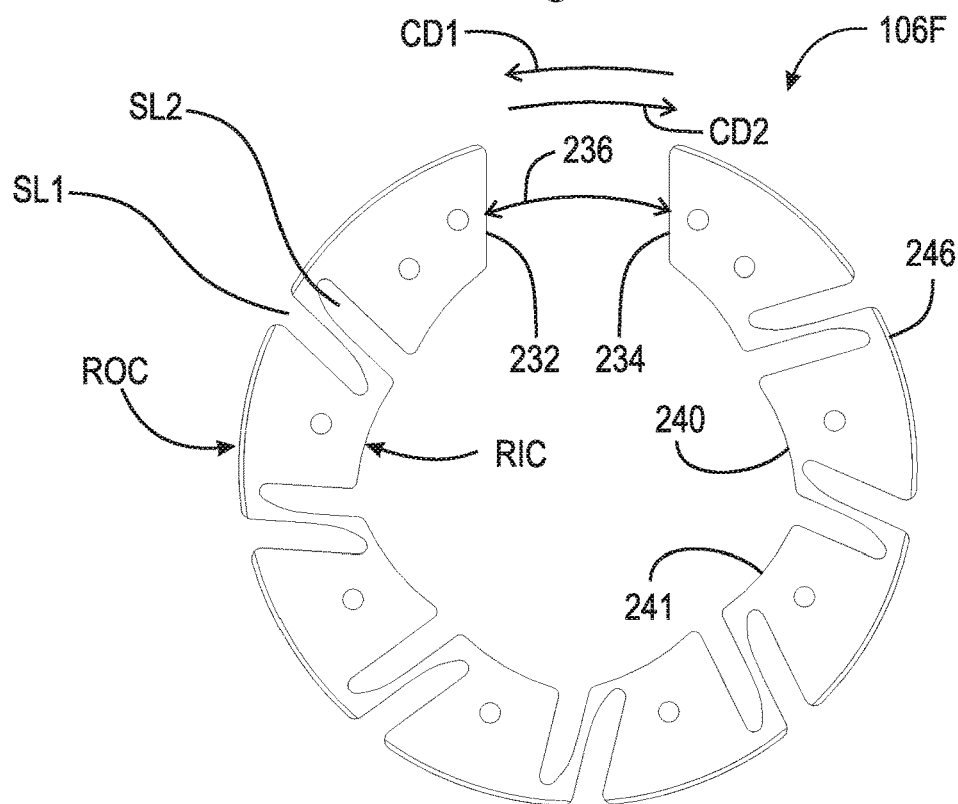
FIG. 17 is a front view of a wedge plate of the wedge clutch with residual magnetism attenuation shown in FIG. 1.4.

FIG. 17 is a front view of wedge plate 106F of electromagnetic selectable wedge clutch 220 shown in FIG. 14. The following should be viewed in light of FIGS. 14 through 17. Wedge plate 106F includes: circumferential end 232; and circumferential end 234. Wedge plate 106F is discontinuous between end 232 and end 234. For example, ends 232 and 234 are separated by gap 236 in circumferential direction CD1. End 105A of coil core piece 110A is fixedly connected to circumferential end 232. End 105B of coil core piece 110B is fixedly connected to circumferential end 234. In an example embodiment, end 105A of coil core piece 110A is fixedly connected to circumferential ends 226 and 232 with a bolt 237 and end 105B of coil core piece 110B is fixedly connected to circumferential ends 228 and 234 with a bolt 237. However, it should be understood that any means known in the art can be used to fixedly connect coil core pieces 110A and 110B to wedge plates 106E and 106F.

To transition from the locked mode to the free-wheel mode, electromagnetic actuator 107C is arranged to be energized to: bring circumferential end 226 and circumferential end 228 toward each in circumferential direction CD1 or circumferential direction CD2; and bring circumferential end 232 and circumferential end 234 toward each in circumferential direction CD1 or circumferential direction CD2. Stated otherwise, electromagnetic actuator 107C is arranged to be energized to decrease gaps 230 and 236.

Figure 18:
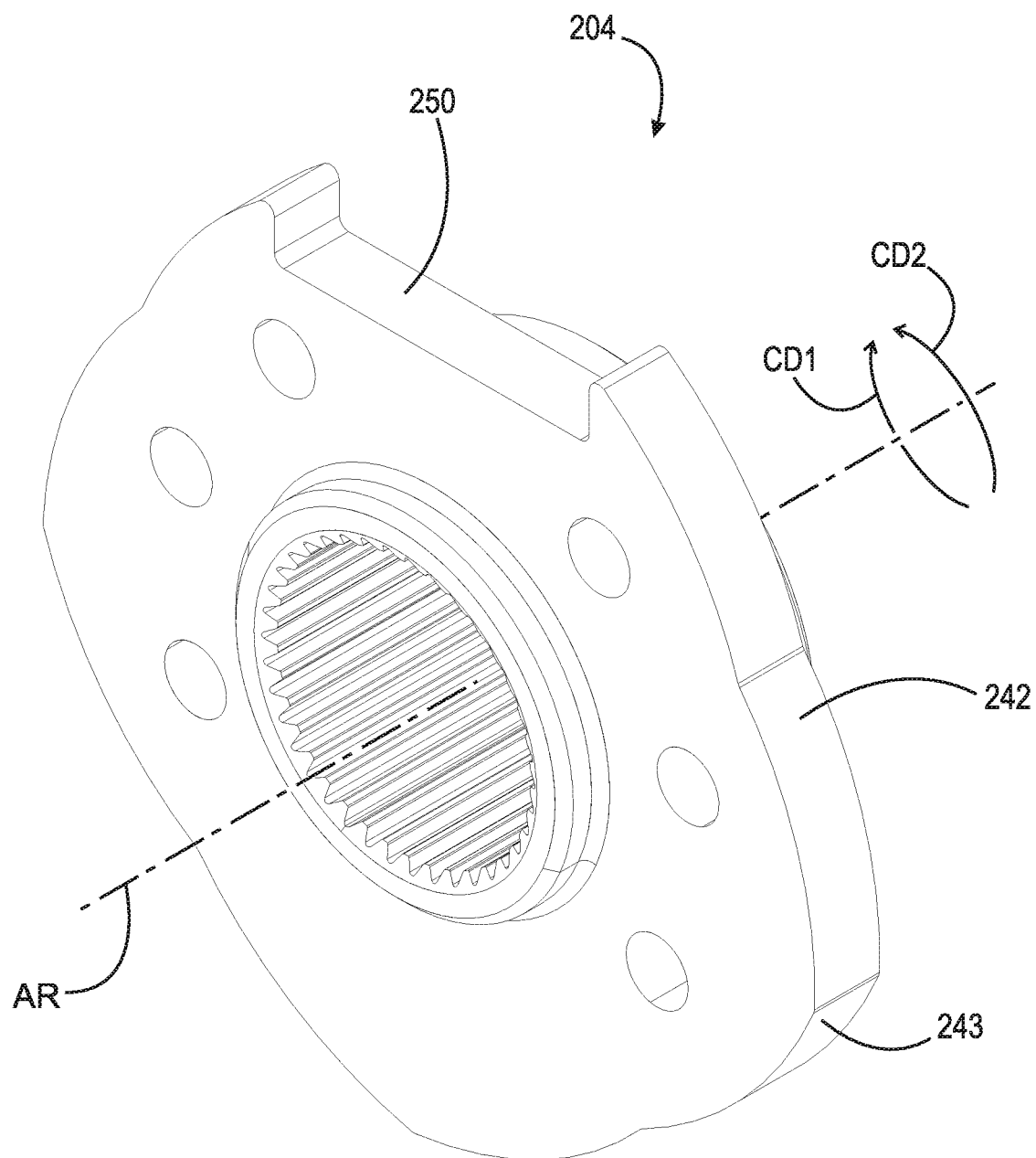
FIG. 18 is a front view of an inner race of the wedge clutch with residual magnetism attenuation shown in FIG. 1.4.

FIG. 18 is a front view of inner race 224 of wedge clutch 220 with residual magnetism attenuation shown in FIG. 14. The following should be viewed in light of FIGS. 14 through 18. Wedge plate 106E includes ramps 238 and 239. Wedge plate 106F includes ramps 240 and 241. Inner race 224 includes ramps 242 and 243. Each ramp 238 is in contact with a respective ramp 242. Each ramp 239 is in contact with a respective ramp 243. Each ramp 240 is in contact with a respective ramp 242. Each ramps 241 is in contact with a respective ramp 243. Ramps 238, 240, and 242 slope radially inwardly in circumferential direction CD2. Ramps 239, 241, and 243 slope radially inwardly in circumferential direction CD1.

Figure 19:
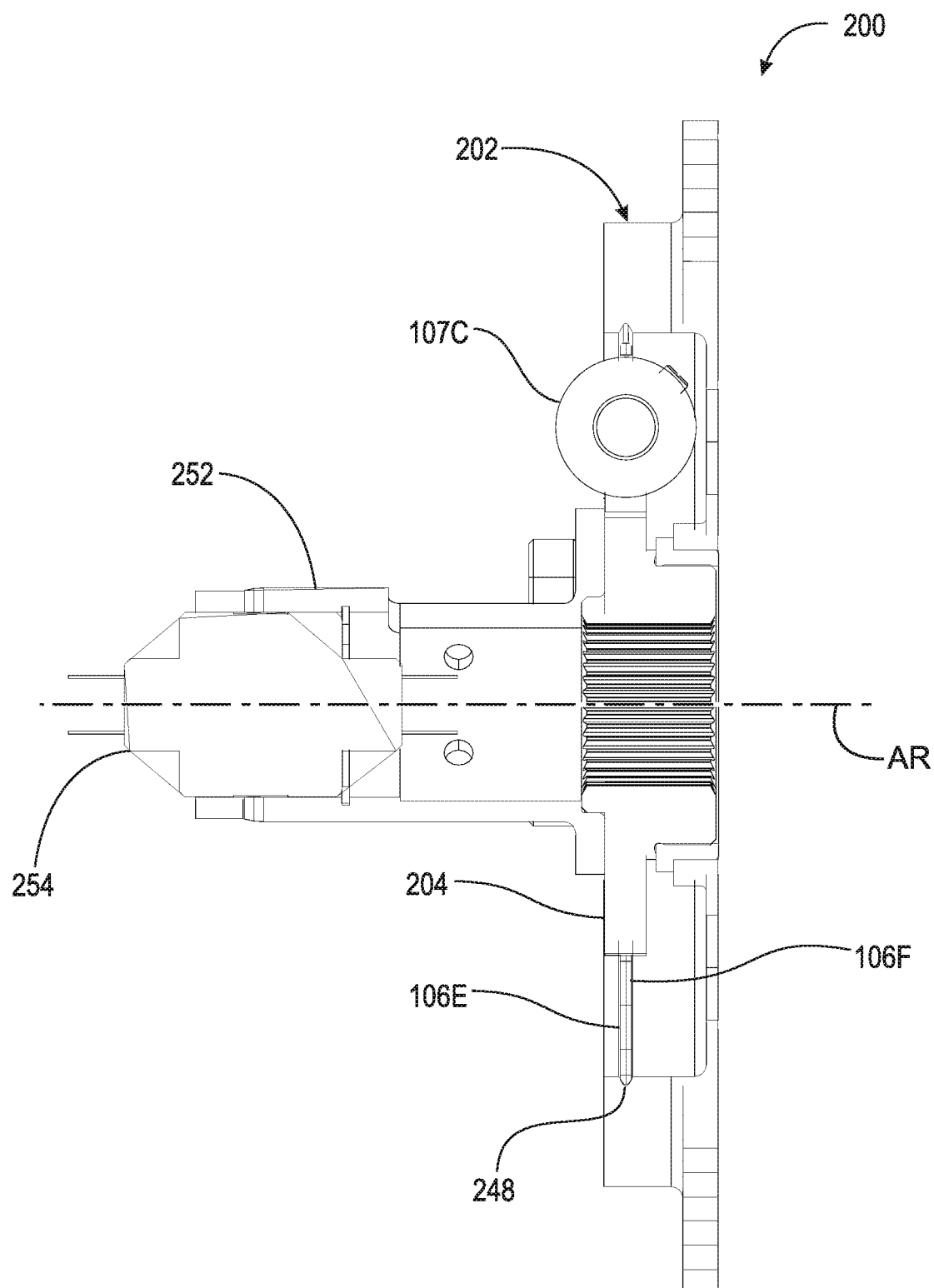
FIG. 19 is a cross-sectional view generally along line 19-19 in FIG. 15.

FIG. 19 is a cross-sectional view generally along line 19-19 in FIG. 15. The following should be viewed in light of FIGS. 14 through 19. In an example embodiment: wedge plate 106E includes chamfer 244; wedge plate 106F includes chamfer 246; and inner race 224 includes groove 248. Chamfers 244 and 246 are disposed at least partly in groove 248. In an example embodiment: inner race 224 includes slot 250, in which actuator 107C is located. Electrical power is supplied to actuator 107C by any means known in the art. In an example embodiment, clutch 220 includes slip ring retainer 252 and slip ring 254 for supplying electrical power to actuator 107C.

It should be understood that clutches 100 and 220 are not limited to the example embodiments shown and described. For example, the circumferential directions in which respective ramps slope can be reversed. For example, different numbers of ramps for wedge plates and inner races are possible.

FIG. 20 is a front view of example wedge clutch 300 with residual magnetism attenuation.

FIG. 21 is an enlarged view of region 21 in FIG. 20. The following should be viewed in light of FIGS. 20 and 21. Wedge clutch 300 includes: outer race 302; inner race 304; wedge plate 306 radially disposed between inner race 304 and outer race 302; and electromagnetic actuator 308 including attenuating circuit 108. Electromagnetic actuator 308 is embedded in wedge plate 306 and includes coil 310 and coil core piece 312 with: end 314 fixedly connected to wedge plate 306; and end 316 enclosed by coil 310. Coil 310 is wrapped about fingers 318 formed by wedge plate 306. That is, wedge plate 306 forms a portion of actuator 308. Attenuating circuit 108 for actuator 308 is schematically presented in FIG. 21. An actual configuration and position of circuit 108 is dependent at least in part upon the configuration of the electrical system powering actuator 308. Wedge plate 306 is analogous to ferromagnetic material FM discussed in FIGS. 1 through 4. Actuator 308 has only one single coil core piece 310.

In the configuration of FIG. 20, inner race 304 is arranged to receive rotational torque. Wedge plate 306 includes ramps 320 and 322. Inner race 304 includes: ramps 324, engaged with ramps 320; and ramps 326 engaged with ramps 322. The discussion for FIGS. 14 through 19 regarding wedge plate 106E, ramps 238, 239, 242, and 243 is applicable to wedge plate 306, and ramps 320, 322, 324, and 326, respectively.

The discussion for FIGS. 14 through 19 regarding operation of clutch 220 is generally applicable to clutch 300. Like clutch 220, clutch 300 has a free-wheel operating mode and a locked operating mode. To transition from the locked mode to the free-wheel mode, actuator 308 is energized to displace coil core piece 310 in circumferential direction CD1 to displace wedge plate 306 radially inwardly and radially contract wedge plate 306 so that inner race 304 and wedge plate 306 are rotatable with respect to outer race 302. To transition from the free-wheel mode to the locked mode, actuator 308 is de-energized and wedge plate 306 displaces radially outwardly to initiate or increase frictional contact between wedge plate 306 and outer race 302 to non-rotatably connect inner race 304, wedge plate 306, and outer race 302.

As noted above, when electrical power is removed from coil 109, magnetic field MF in material FM decreases but does not disappear completely. The residual field MF can be detrimental to the operation of clutches 100 and 200. For example, for clutch 100 and actuator 107A, a residual field MF can continue to urge ends 111A and 111B toward each other during the transition from the first free-wheel mode to the first locked mode. As a result, wedge plates 106A and 106B may not expand and displace radially outwardly to engage outer race 102 with sufficient frictional force to cause wedge plates 106A and 106B to rotate with outer race 102 and with respect to inner race 104. Without the preceding rotations, the transition to the locked mode does not occur. The residual field MF could prevent the transition from the first free-wheel mode to the first locked mode, or could delay the transition from the first free-wheel mode to the first locked mode, either of which would be detrimental to operation of clutch 100 and any device, such as a power train, including clutch 100.

Attenuating circuit 108 for actuator 107A eliminates a residual field MF in actuator 107A as described above in the discussion for FIGS. 1 through 4. Thus, circuit 108 in actuator 107A eliminates potential problems noted above regarding operation of clutch 100. The preceding discussion regarding a residual field MF in actuator 107A is applicable to actuator 107B and 107C.

When electrical power is removed from coil 310, a magnetic field in wedge plate 306 decreases but does not disappear completely. A residual magnetic field can be detrimental to the operation of clutch 300. For example, a residual magnetic field can continue to urge end 316 in direction CD1 during the transition from the free-wheel mode to the locked mode. As a result, wedge plate 306 may not expand and displace radially outwardly to engage outer race 302 with sufficient frictional force to cause wedge plate 306 to rotate with outer race 302 and with respect to inner race 304. Without the preceding rotations, the transition to the locked mode does not occur. The residual magnetic field could prevent the transition from the free-wheel mode to the locked mode, or could delay the transition from the free-wheel mode to the locked mode, either of which would be detrimental to operation of clutch 300 and any device, such as a power train, including clutch 300.

Attenuating circuit 108 for actuator 308 eliminates a residual magnetic field in wedge plate 308 as described above for actuator 107A. Thus, circuit 108 in actuator 308 eliminates potential problems noted above regarding operation of clutch 300.

Figure 22:
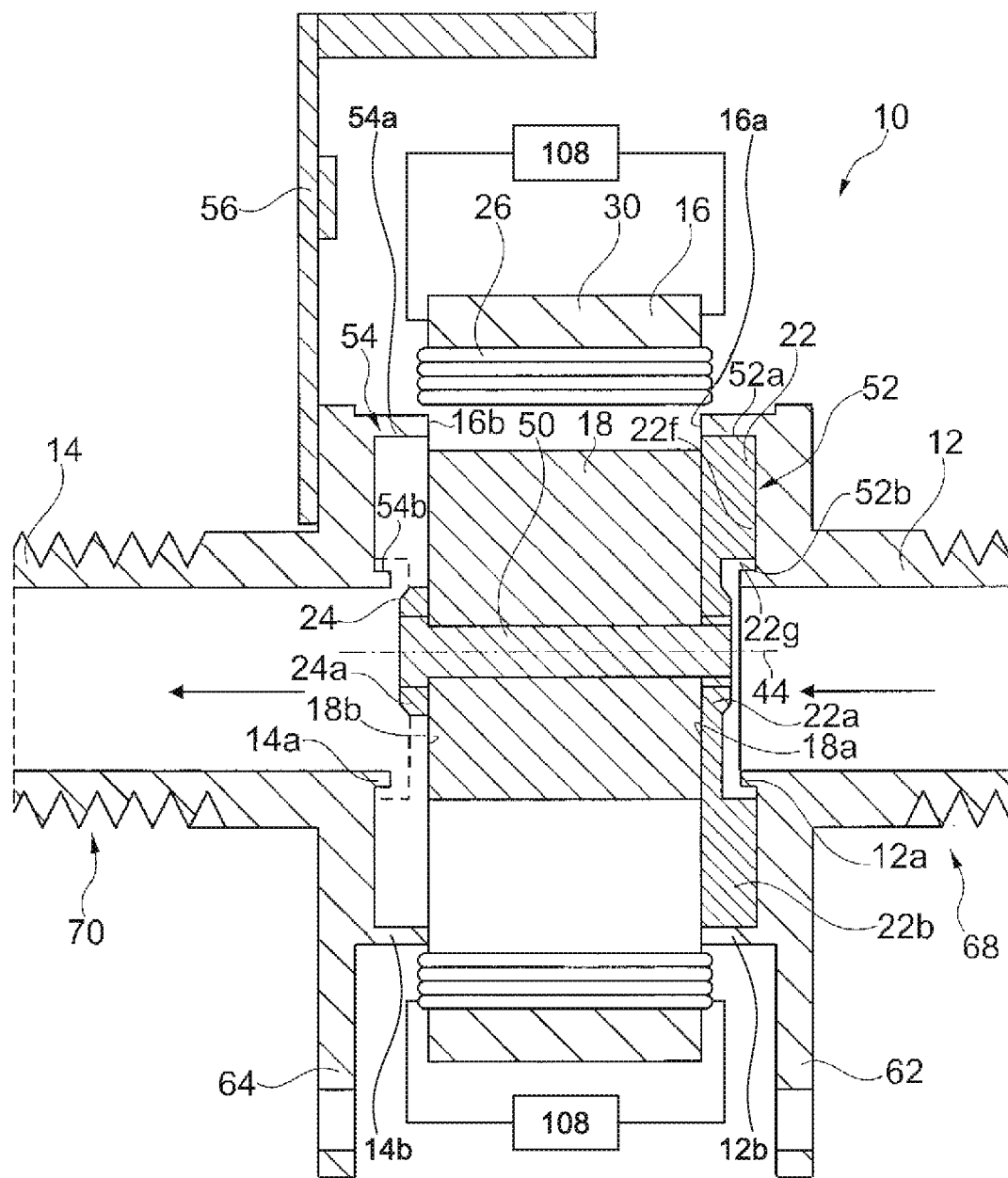
FIG. 22 is a schematic cross-sectional view of a pump, with residual magnetism attenuation.

FIG. 22 is a schematic cross-sectional view of pump 10, with residual magnetism attenuation.

Figure 23:
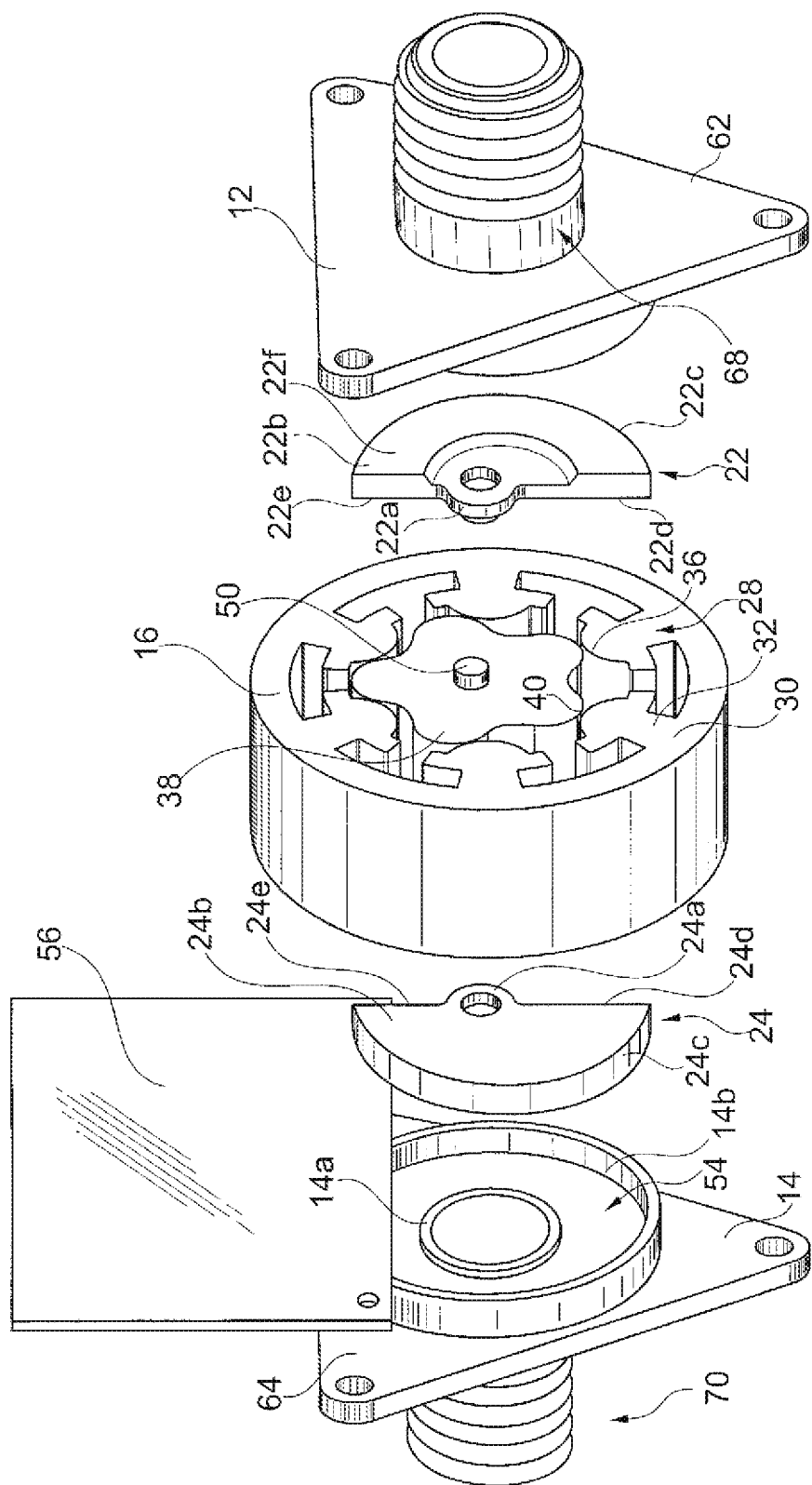
FIG. 23 is an exploded view of the pump shown in FIG. 22.

FIG. 23 is an exploded view of pump 10 shown in FIG. 22.

Figure 24:
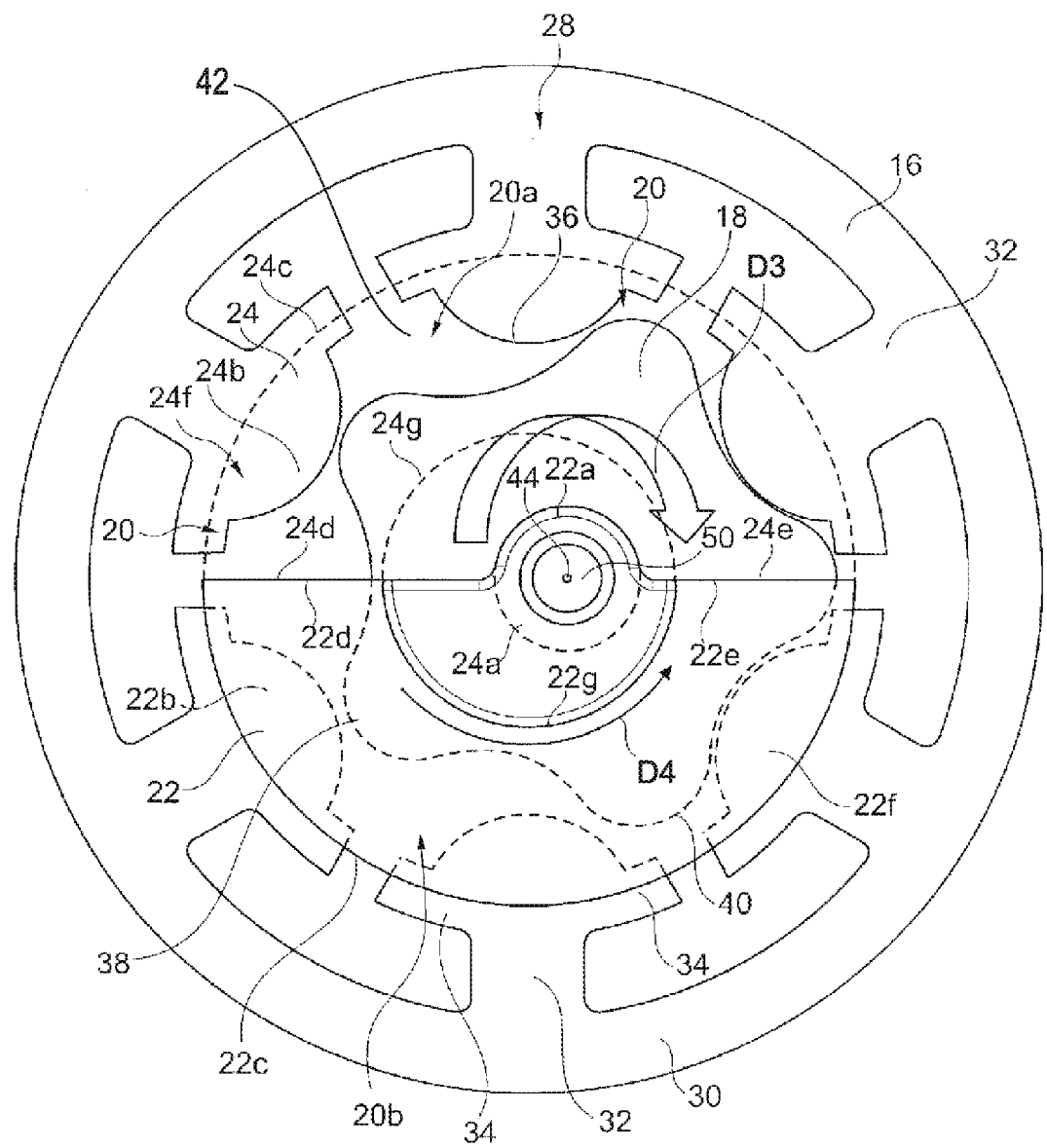
FIG. 24 is a front view of a stator, a rotor and a swash plate of the pump shown in FIG. 22.

FIG. 24 is a front view of a stator, a rotor and a swash plate of the pump shown in FIG. 22. The following should be viewed in light of FIGS. 22 through 24. Pump 10 includes: fluid inlet section 12 of a housing; fluid outlet section 14 of the housing; stator 16 axially between fluid inlet section 12 and fluid outlet section 14; and rotor 18 axially between fluid inlet section 12 and fluid outlet section 14. Rotor 18 and stator 16 define fluid flow space 20 radially therebetween. Pump 10 also includes: movable inlet guide, or swash plate, 22 configured for guiding fluid flow from fluid inlet section 12 into fluid flow space 20; and movable outlet guide, for swash plate, 24 configured for guiding fluid flow from fluid flow space 20 into fluid outlet section 14.

Stator 16 is provided with electrical windings 26 for generating electromagnetic forces in stator 16 to urge rotor 18 toward stator 16 such that rotor 18 rotates inside of stator 16. In an example embodiment, stator 16 is provided with six electrical windings 26, but in other embodiments, stator 16 may be provided with any other amounts of windings 26 greater than three. Windings 26 are each wrapped around one of legs 28 of stator 16. Stator 16 includes cylindrical ring 30 defining an outer circumference of stator 16, with each leg 28 protruding radially inward from cylindrical ring 30. Each legs 28 includes base 32 extending radially inward from an inner circumference of cylindrical ring 30, two branches 34 extending circumferentially from a radially inner end of base 32 in opposite circumferential directions, and rounded radially innermost tip 36 protruding radially inward from branches 34. Windings 26 are wrapped around base 32 and held radially in place by the inner circumferential surface of cylindrical ring 30 and the outer circumferential surfaces of branches 34. In an example embodiment (not shown) insulation layers are provided over windings 26 to insulate windings from fluid flow space 20.

Rotor 18 is substantially star shaped and includes radially outwardly extending protrusions 38. In an example embodiment, rotor 18 includes five protrusions 38. However, rotor 18 may include other amounts of protrusions 38, with the amount of protrusions 38 being one less than the number of windings 26. Protrusions 38 each include radially outermost rounded tip 40. Rotor 18 is configured such that during rotation, protrusions 38 sequentially enter into slots 42 between protrusions 38 to continuously vary the configuration of fluid flow space 20.

When an electric current is sent through any one of windings 26 a magnetic field is created which pulls rotor 18 toward that winding 26 in order to complete a magnetic circuit formed by legs 28 of the stator. As rotor 18 moves toward the winding 26, rotor 18 displaces fluid, with which fluid flow space 20 between rotor 18 and stator 16 is filled, creating pressure. The movement of rotor 18 within stator 16 separates fluid flow space 20 into portion 20a pressurized to force fluid out of outlet section 14 and a portion 20b that forms a vacuum to draw fluid into fluid flow space 20 from inlet section 12. As rotor 18 rotates within stator 16, the locations of portion 20a and portion 20b rotate about a center axis 44, with portion 20a being oriented on the opposite radial side of rotor 18 as portion 20b during the rotation.

In order to properly align inlet section 12 with portion 20b while isolating inlet section 12 from portion 20a, pump 10 includes a movable inlet guide in the form of inlet swash plate 22 upstream from rotor 18. In order to properly align outlet section 14 with portion 20a, while isolating inlet section 12 from second portion 20b, pump 10 includes a movable outlet guide in the form of an outlet swash plate 24 downstream from rotor 18. Inlet swash plate 22 is configured to move to align portion 20a of fluid flow space 20 with fluid inlet section 12 and outlet swash plate 24 is configured to move to align portion 20b of fluid flow space 20 with the fluid outlet section 14. More specifically, swash plates 22 and 24 non-rotatably fixed to rotor 18 such that swash plates 22 and 24 are configured to rotate about center axis 44 in the opposite direction as rotor 18. Swash plates 22 and 24 are circumferentially offset from each other and on diametrically opposite radial sides of center axis 44 when viewed cross-sectionally in the axial direction.

FIG. 24 illustrates an axially facing cross-sectional view stator 16, rotor 18, inlet swash plate 22 and outlet swash plate 24 from the fluid inlet side of pump 10. As shown in FIG. 24, swash plates 22 and 24 are arranged in a complementary manner to form a circle, with each swash plate 22 or 24 having a semi-circular cross section as define by the outer circumference of each swash plate 22 or 24. Rotor 18 rotates about axis 44 in a rotational direction D3 while swash plates 22 and 24 rotate about axis 44 in rotational direction D4.

Fluid from the high pressure side, i.e., portion 20b, is pushed past outlet swash plate 24 and out outlet section 14. At the same time, fluid is drawn in through inlet section 12 past inlet swash plate 22, filling the vacuum side, i.e., portion 20a of rotor 18. When rotor 18 is travelling toward a particular winding 26, the next winding 26 is energized and the process continues, rolling rotor 18 around the inside of stator 16 and pumping fluid from inlet section 12 to outlet section 14. Because the high and low pressure sides are continuously moving around stator 16, swash plates 22 and 24 are used to align the high pressure side with the outlet and the low pressure side with the inlet. Swash plates 22 and 24 are centered on lips 12a and 12b of inlet section 12 and lips 14a and 14b of outlet section 14, respectively, and are driven by a pin 50 in rotor 18. This causes swash plates 22 and 24 to rotate in the opposite direction that rotor 18 is rolling, maintaining alignment with the correct pressures.

As noted above, for an electric reluctance motor, such as is embodied by pump 10, windings 26 energized and de-energized in sequence to create rotating magnetic fields that rotate rotor 18. However, also as noted above, residual magnetism can remain in stator 16 when a winding 26 is de-energized. Specifically, when an electric current is sent through any one of windings 26 a magnetic field is created which pulls rotor 18 toward that winding 26 in order to complete a magnetic circuit formed by legs 28 of the stator. Thus, when the particular winding 26 noted above is energized, a magnetic field is created through the leg 28 about which the particular winding is wrapped. When the next winding 26 is energized, the particular winding 26 is de-energized. The magnetic field created by the particular winding 26 is diminished when the particular winding 26 is de-energized; however, residual magnetism may remain in the leg 28 about which the particular winding is wrapped. As the next winding 26 is energized to rotate the rotor, the residual magnetism resists the rotation of the rotor, interfering with the operation of pump 10 and reducing the efficiency of pump 10.

However, a circuit 108, wired in parallel with a winding 26 reduces or removes the residual magnetism from the winding 26. For example, each winding 26 is analogous to coil 109 discussed in FIGS. 1 through 4 and each leg 28 is analogous to ferromagnetic material FM discussed in FIGS. 1 through 4. An attenuating circuit 108 is schematically presented for only two winding 26 in FIG. 22. However, it should be understood that an attenuating circuit can be wired to every winding 26 in pump 10. An actual configuration and position of circuit(s) 108 is dependent at least in part upon the configuration of the electrical system powering windings 26.

Swash plate 22 and 24 are fixed together and to rotor 18 by pin 50 extending axially through rotor 18 and defining center axis 44. Rotor 18 is mounted eccentrically on pin 50 such that rotor 18 rotates eccentrically about center axis 44 during operation of pump 10. Inlet swash plate 22 is mounted on a first axial end of pin 50 and swash plate 24 is mounted on a second axial end of pin 50. Inlet section 12 includes annular groove 52 for guiding the rotation of swash plate 22 and outlet section 14 similarly includes annular groove 54 for guiding the rotation of swash plate 24. The rotation of rotor 18 causes swash plates 22 and 24 to slide in annular grooves 52 and 54, respectively, such that the outer circumference of each swash plate 22 or 24 moves circumferentially, but does not move radially, while pin 50 and center axis 44 follow a circular path due to the eccentric placement of pin 50 on swash plates 22 and 24.

Swash plates 22 and 24 each include connecting portion 22a and 24a and a guide portion 22b and 24b eccentrically fixed to the respective connecting portion 22a and 24a. Guide portions 22b and 24b each include a respective outer circumferential surface 22c and 24c, a respective longer radially extending surface 22d and 24d extending radially from the respective connecting portion 22a and 24a to a first edge of respective outer circumferential surface 22c and 24c and short radially extending surface 22e and 24e extending radially from the respective connecting portion 22a and 24a to a second edge of the respective outer circumferential surface 22c and 24c.

Each guide portion 22b and 24b also includes an axially protruding arc-shaped lip 22f and 24f configured for sliding in annular grooves 52 and 54, respectively. Outer circumferential surfaces 22c and 24c of lips 22f and 24f slide along outer circumferential surface 52a and 54a of grooves 52 and 54, respectively, and inner circumferential surfaces 22g and 24g of lips 22f and 24f slide along an inner circumferential surface 52b and 54b of grooves 52 and 54, respectively. Inner circumferential surface 52b of annular groove 52 is defined by annular inner circumferential lip 12a of inlet section 12 and outer circumferential surface 52a of annular groove 52 is defined by annular outer circumferential lip 12b of inlet section 12. Similarly, inner circumferential surface 54b of annular groove 54 is defined by annular inner circumferential lip 14a of outlet section 14 and outer circumferential surface 54a of annular groove 54 is defined by an annular outer circumferential lip 14b of outlet section 14.

Inlet swash plate 22 is axially in contact with a radially extending inlet side surface 18a of rotor 18 and an inner portion of a radially extending inlet side surface 16a of stator 16 and outlet swash plate 24 is axially in contact with a radially extending outlet side surface 18b of rotor 18 and an inner portion of a radially extending outlet side surface 16b of stator 16. Annular outer circumferential lip 12b of inlet section 12 also contacts radially extending inlet side surface 16a of stator 16 and annular outer circumferential lip 14b of outlet section 14 contacts radially extending outlet side surface 16b of stator 16. Inlet and outlet sections 12 and 14, are provided with flanges 62 and 64, respectively, which in this embodiment are triangular, that include through holes for receiving fasteners for clamping sections 12 and 14 axially together onto stator 16. Protruding axially outward from flanges 62 and 64, respectively, inlet and outlet sections 12 and 14 include respective male threaded tubes 68 and 70 for connecting to corresponding female threaded components.

Pump 10 also includes controller 56 configured to control the flow of the current through electrical windings 26 to rotate rotor 18. In an example embodiment, controller 56 is in the form of transistors on a control board for electrically commutating and controlling pump 10. Alternately, the controller can be remote and connected to windings 26 by wires.

In the example of FIGS. 20 through 22, pump 10 is a gerotor pump; however, in other embodiments, a similar construction may be made with other pump types, including an internal gear pump or a vane pump.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AR axis of rotation
B magnetic flux density
B_sat saturation point
B_r residual magnetism
CU control unit
CV1 control voltage
CV2 control voltage
D1 direction
D2 direction
D3 direction
D4 direction
EC1 electrical current
EC2 electrical current
EG electrical ground
EPS electrical power source
FM1 ferromagnetic material
G1 gate
G2 gate
G3 gate
H magnetic field strength
MF magnetic field
OC oscillating circuit
OW oscillating waveform
R resistor value
R1 resistor
RIC radially inner circumference
ROC radially outer circumference
SL1 slot
SL2 slot
Vc capacitor voltage
Vs source voltage
10 pump
12 fluid inlet
12a lip, fluid inlet
12b lip, fluid inlet
14 fluid outlet
14a lip, fluid inlet
14b lip, fluid inlet
16 stator
16a surface, stator
16b surface, stator
18 rotor
18a surface, rotor
18b surface, rotor
20 fluid flow space
20a portion, fluid flow space
20b portion, fluid flow space 22 inlet guide
22a portion, inlet guide
22b portion, inlet guide
22c portion, inlet guide
22d portion, inlet guide
22e portion, inlet guide
22f portion, inlet guide
22g portion, inlet guide
24 outlet guide
24a portion, outlet guide
24b portion, outlet guide
24c portion, outlet guide
24d portion, outlet guide
24e portion, outlet guide
24f portion, outlet guide
24g portion, outlet guide
26 windings
28 leg, stator
30 ring, stator
32 base, leg
34 branches, leg
36 tip, leg
38 protrusion
40 tip
42 slot
44 center axis
50 pin
52 groove, inlet section
52a surface groove, inlet section
52b surface groove, inlet section
54 groove, outlet section
54a surface groove, outlet section
54b surface groove, outlet section
56 controller
62 flange, inlet
64 flange, outlet
68 tube
70 tube
100 wedge plate clutch
102 outer race
104 inner race
105 end, coil core piece
105A end, coil core piece
105B end, coil core piece
106 wedge plate
106A wedge plate
106B wedge plate
106C wedge plate
106D wedge plate
106E wedge plate
106F wedge plate
107 electromagnetic actuator
107A electromagnetic actuator
107B electromagnetic actuator
107C electromagnetic actuator
108 attenuating circuit
109 coil
110 coil core piece
110A coil core piece
110B coil core piece
111 end, coil core piece
111A end, coil core piece
111B end, coil core piece
112 capacitor
113 switch, transistor
114 switch, transistor
115 transistor
116 bobbin
118 air gap
120 circumferential end, wedge plate
122 circumferential end, wedge plate
124 gap
126 circumferential end, wedge plate
128 circumferential end, wedge plate
130 gap, wedge plate
132 bolt
134 ramp, wedge plate
136 ramp, wedge plate
138 ramp, inner race
140 inner race
142 bolt
144 circumferential end, wedge plate
146 circumferential end, wedge plate
148 gap, wedge plate
150 circumferential end, wedge plate
152 circumferential end, wedge plate
154 gap, wedge plate
156 ramp, wedge plate
158 ramp, wedge plate
160 ramp, inner race
162 chamfer
164 chamfer
166 groove
168 chamfer
170 chamfer
172 groove
174 slot
176 slot
178 slip ring retainer
180 slip ring
220 wedge clutch
222 outer race
224 inner race
226 circumferential end, wedge plate
228 circumferential end, wedge plate
230 gap, wedge plate
232 circumferential end, wedge plate
234 circumferential end, wedge plate
236 gap, wedge plate
237 bolt
238 ramp, wedge plate
239 ramp, wedge plate
240 ramp, wedge plate
241 ramp, wedge plate
242 ramp, inner race
243 ramp, inner race
244 chamfer
246 chamfer
248 groove
250 slot
252 slip ring retainer
254 slip ring
300 electromagnetic actuator
302 outer race
304 inner race
306 wedge plate
308 electromagnetic actuator
310 coil
312 coil core piece
314 end, coil core piece
316 end, coil core piece
318 finger, wedge plate

The invention claimed is:

1. A wedge clutch, comprising:
an axis of rotation;
an inner race;
an outer race located radially outward of the inner race;
a wedge plate radially disposed between the inner race and the outer race;
an electromagnetic actuator including:
a coil arranged to be energized by an electrical power source to displace the wedge plate, with respect to the inner race or the outer race, to switch the wedge clutch between:
a first locked mode of the wedge clutch, in which the inner race, the wedge plate, and the outer race are non-rotatably connected for rotation of the inner race in a first circumferential direction; and,
a first free-wheel mode of the wedge clutch, in which the inner race is rotatable, with respect to the outer race, in the first circumferential direction; and,
an attenuating circuit including:
a capacitor wired in parallel with the coil; and,
a first switch wired to the capacitor, wherein:
during the first free-wheel mode:
the first switch is arranged to connect the capacitor to an electrical ground; and,
the electrical power source is arranged to:
energize the coil; and,
charge the capacitor with a voltage; and,
following an initiation of the first locked mode:
the first switch is arranged to electrically isolate the capacitor from the electrical ground; and,
the capacitor is arranged to discharge the voltage through the coil.

2. The wedge clutch of claim 1, wherein following the initiation of the first locked mode, the coil and the capacitor are arranged to alternately drive:
first electrical current through the coil in a first direction; and,
second electrical current through the coil in a second direction, opposite the first direction.

3. The wedge clutch of claim 2, wherein following the initiation of the first locked mode, the coil and the capacitor are arranged to alternately drive the first electrical current and the second electrical current to randomize residual magnetic fields in the electromagnetic actuator and attenuate residual magnetic saturation in the electromagnetic actuator.

4. The wedge clutch of claim 1, wherein:
the attenuating circuit includes a second switch, the second switch:
electrically connected to the capacitor; and,
arranged to electrically connect to the electrical power source; and,
following the initiation of the first locked mode, the second switch is arranged to electrically isolate the capacitor from the electrical power source.

5. The wedge clutch of claim 1, wherein:
the wedge plate includes:
a first circumferential end;
a second circumferential end; and,
a gap between the first circumferential end and the second circumferential end;
to transition from the first locked mode to the first free-wheel mode, the coil is arranged to be energized by the electrical power source to:
draw the first circumferential end and the second circumferential end closer together; and,
displace the wedge plate radially inwardly; and,
to transition from the first free-wheel mode to the first locked mode:
the electromagnetic actuator is arranged to be de-energized; and,
the wedge plate is arranged to displace radially outwardly.

6. The wedge clutch of claim 5, wherein:
the electromagnetic actuator includes only one single coil core piece with an end enclosed by the coil;
the only one single coil core piece is fixedly connected to the first circumferential end; and,
the coil is arranged to be energized by the electrical power source to displace the only one single coil core piece toward the second circumferential end to switch the wedge clutch from the first locked mode to the first free-wheel mode.

7. The wedge clutch of claim 6, wherein:
the wedge plate includes:
a plurality of first ramps sloping radially inwardly in the first circumferential direction; and,
a plurality of second ramps sloping radially inwardly in a second circumferential direction opposite the first circumferential direction;
the inner race includes:
a plurality of first ramps sloping radially inwardly in the first circumferential direction; and,
a plurality of second ramps sloping radially inwardly in the second circumferential direction;
each first ramp of the wedge plate is in contact with a respective first ramp of the inner race; and,
each second ramp of the wedge plate is in contact with a respect second ramp of the inner race.

8. The wedge clutch of claim 7, wherein:
in the first locked mode of the wedge clutch, the inner race, the wedge plate, and the outer race are non-rotatably connected for rotation of the inner race in the second circumferential direction; and,
in the first free-wheel mode of the wedge clutch, the inner race is rotatable, with respect to the outer race, in the second circumferential direction.

9. The wedge clutch of claim 5, wherein:
the electromagnetic actuator includes:
a first coil core piece:
fixedly connected to the first circumferential end; and,
with an end enclosed by the coil;
a second coil core piece:
fixedly connected to the second circumferential end; and,
with an end enclosed by the coil; and,
a gap, enclosed by the coil, between the first coil core piece and the second coil core piece; and,
the coil is arranged to be energized by the electrical power source to displace the first coil core piece and the second coil core piece toward each other to switch the wedge clutch from the first locked mode to the first free-wheel mode.

10. The wedge clutch of claim 9, wherein:
the inner race includes a plurality of first ramps sloping radially inwardly in the first circumferential direction;
the wedge plate includes a plurality of first ramps sloping radially inwardly in the first circumferential direction;
each first ramp of the wedge plate is in contact with a respective first ramp of the inner race; and,
to transition from the first locked mode to the first free-wheel mode, the electromagnetic actuator is arranged to slide, in the first circumferential direction, at least first ramp of the wedge plate radially inwardly along at least one first ramp of the inner race.

11. The wedge clutch of claim 10, wherein:
in a second locked mode of the wedge clutch, the inner race, the wedge plate, and the outer race are non-rotatably connected for rotation of the inner race in a second circumferential direction, opposite the first circumferential direction;
in a second free-wheel mode of the wedge clutch, the inner race is rotatable, with respect to the outer race, in the second circumferential direction;
the inner race includes a plurality of second ramps sloping radially inwardly in the second circumferential direction;
the wedge plate includes a plurality of second ramps sloping radially inwardly in the second circumferential direction;
each second ramp of the inner race is in contact with a respective second ramp of the wedge plate; and,
to transition from the second locked mode to the second free-wheel mode, the electromagnetic actuator is arranged to slide at least second ramp of the wedge plate radially inwardly along at least one second ramp of the inner race.

12. A wedge clutch, comprising:
an axis of rotation;
an inner race;
an outer race located radially outward of the inner race;
a wedge plate radially disposed between the inner race and the outer race and including:
    a first circumferential end; and,
    a second circumferential end;
an electromagnetic actuator including:
    a coil:
        including a first coil core piece:
            fixedly connected to the first circumferential end; and,
            with an end enclosed by the coil; and,
        arranged to be energized by an electrical power source to draw the first circumferential end and the second circumferential end toward each other to switch the wedge clutch between:
            a locked mode in which the inner race, the wedge plate, and the outer race are non-rotatably engaged for rotation of the inner race in a circumferential direction; and,
            a free-wheel mode in which the inner race is rotatable with respect to the outer race in the circumferential direction; and,
    an attenuating circuit including:
        a capacitor electrically wired in parallel with the coil; and,
        a first switch electrically connected to the capacitor,
wherein:
during the free-wheel mode:
    the first switch is arranged to connect the capacitor to an electrical ground; and,
    the electrical power source is arranged to:
        charge the capacitor with a voltage; and,
        energize the coil; and,
following an initiation of the locked mode:
    the first switch is arranged to electrically isolate the capacitor from the electrical ground; and,
    the capacitor is arranged to discharge the voltage through the coil.

13. The wedge clutch of claim 12, wherein following the initiation of the locked mode, the coil and the capacitor are arranged to alternately drive:
first electrical current through the coil in a first direction; and,
second electrical current through the coil in a second direction, opposite the first direction.

14. The wedge clutch of claim 13, wherein following the initiation of the locked mode, the coil and the capacitor are arranged to alternately drive the first electrical current and the second electrical current to randomize residual magnetic fields in the electromagnetic actuator and attenuate residual magnetic saturation in the electromagnetic actuator.

15. The wedge clutch of claim 12, wherein:
the inner race includes a plurality of ramps sloping radially inwardly in the circumferential direction;
the wedge plate includes a plurality of ramps sloping radially inwardly in the circumferential direction;
each ramp of the wedge plate is in contact with a respective ramp of the inner race; and,
to transition from the locked mode to the free-wheel mode:
    the electromagnetic actuator is arranged to slide at least one ramp of the wedge plate radially inwardly along at least one ramp of the inner race; and,
    the wedge plate is arranged to displace radially inwardly.

16. The wedge clutch of claim 12, wherein to transition to the free-wheel mode to the locked mode:
the electromagnetic actuator is arranged to be de-energized; and,
the wedge plate is arranged to displace radially outwardly to initiate or increase frictional contact between the wedge plate and the outer race.

17. The wedge clutch of claim 12, wherein
the electromagnetic actuator includes:
    a second coil core piece:
        fixedly connected to the second circumferential end; and,
        with an end enclosed by the coil; and,
    a gap, enclosed by the coil, between the first coil core piece and the second coil core piece; and,
the coil is arranged to be energized by the electrical power source to displace the first coil core piece and the second coil core piece toward each other to switch the wedge clutch from the locked mode to the free-wheel mode.

* * * * *